US009822722B2

United States Patent
Tsutsuji et al.

(10) Patent No.: US 9,822,722 B2
(45) Date of Patent: Nov. 21, 2017

(54) FUEL PRESSURE SENSOR ABNORMALITY DIAGNOSIS APPARATUS FOR INTERNAL COMBUSTION ENGINE

(71) Applicant: TOYOTA JIDOSHA KABUSHIKI KAISHA, Toyota-shi (JP)

(72) Inventors: Shunichi Tsutsuji, Okazaki (JP); Koji Honda, Toyota (JP); Makiko Nakayama, Toyota (JP); Kinji Morihiro, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 59 days.

(21) Appl. No.: 14/862,357

(22) Filed: Sep. 23, 2015

(65) Prior Publication Data
US 2016/0090933 A1    Mar. 31, 2016

(30) Foreign Application Priority Data

Sep. 29, 2014  (JP) ................................. 2014-199139

(51) Int. Cl.
*F02D 41/22* (2006.01)
*G01L 27/00* (2006.01)
*F02D 41/40* (2006.01)

(52) U.S. Cl.
CPC ............ *F02D 41/22* (2013.01); *G01L 27/007* (2013.01); *F02D 41/406* (2013.01); *F02D 2041/223* (2013.01); *F02D 2041/224* (2013.01); *Y02T 10/40* (2013.01)

(58) Field of Classification Search
CPC ..... G01L 27/007; F02D 41/22; F02D 41/406; F02D 2041/223; F02D 2041/224; Y02T 10/40
See application file for complete search history.

(56) References Cited

U.S. PATENT DOCUMENTS

| 6,293,251 B1 * | 9/2001 | Hemmerlein | F02D 41/222 |
| | | | 123/357 |
| 7,412,968 B2 * | 8/2008 | Takayanagi | F02D 41/222 |
| | | | 123/198 D |
| 7,832,375 B2 * | 11/2010 | Dusa | F02D 41/06 |
| | | | 123/179.16 |
| 2007/0251502 A1 | 11/2007 | Takayanagi et al. | |
| 2013/0125862 A1 * | 5/2013 | Sahashi | F02D 41/222 |
| | | | 123/447 |

FOREIGN PATENT DOCUMENTS

| JP | 2007-138774 | 6/2007 |
| JP | 2013-68127 A | 4/2013 |

* cited by examiner

*Primary Examiner* — R. A. Smith
*Assistant Examiner* — John M Royston
(74) *Attorney, Agent, or Firm* — Oblon, McClelland, Maier & Neustadt, L.L.P.

(57) ABSTRACT

The fuel pressure sensor abnormality diagnosis apparatus diagnoses that a fuel pressure sensor is abnormal in the case where, because a state where a detected value of the fuel pressure sensor is less than a target value occurs, a fuel discharge amount of a fuel pump is increased, and as a result, the fuel discharge amount reaches its maximum amount, and even if a predetermined period has elapsed since the fuel discharge amount reaches its maximum amount, the detected value is less than the target value.

3 Claims, 14 Drawing Sheets

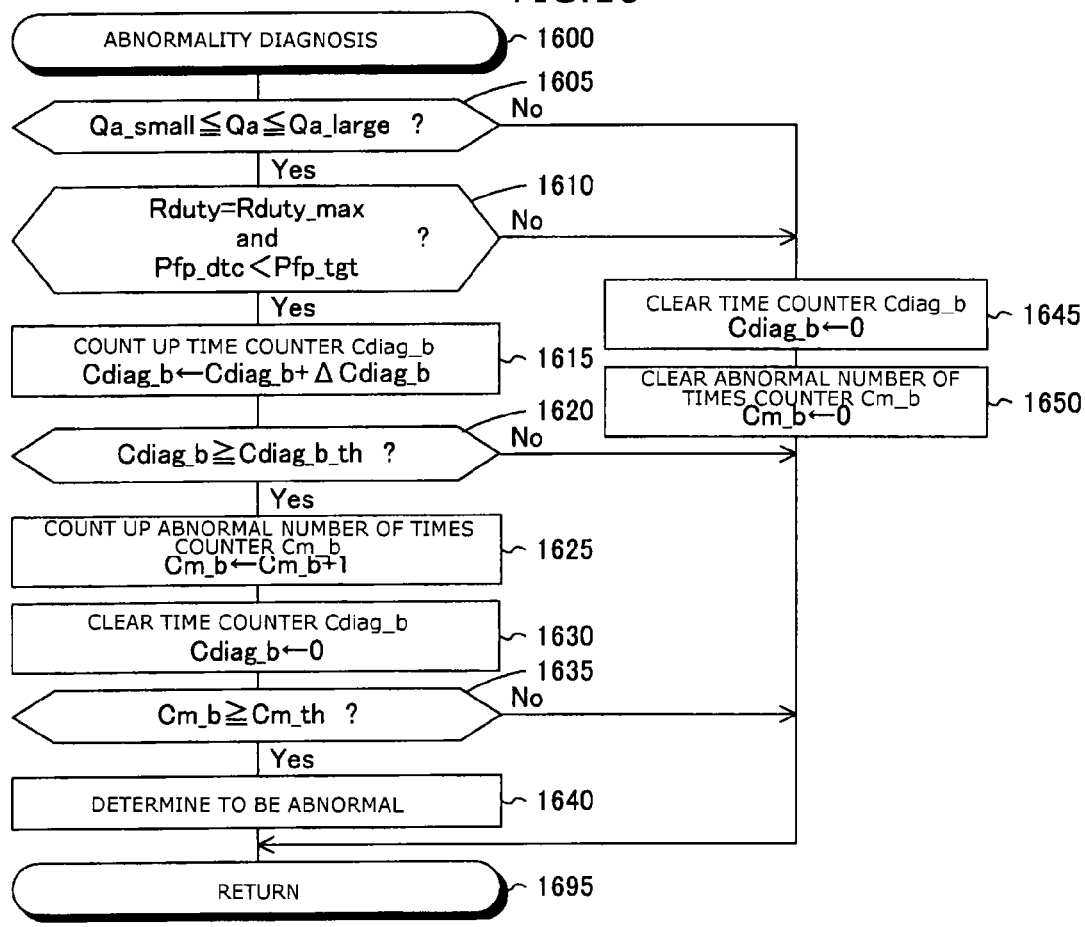

FUEL PRESSURE SENSOR ABNORMALITY DIAGNOSIS APPARATUS FOR INTERNAL COMBUSTION ENGINE

INCORPORATION BY REFERENCE

The disclosure of Japanese Patent Application No. 2014-199139 filed on Sep. 29, 2014 including the specification, drawings and abstract is incorporated herein by reference in its entirety.

BACKGROUND OF THE INVENTION

1. Field of the Invention

The invention relates to a fuel pressure sensor abnormality diagnosis apparatus for diagnosing an abnormality of a fuel pressure sensor for detecting a pressure of fuel supplied to a fuel injection valve of an internal combustion engine.

2. Description of Related Art

A fuel pressure sensor abnormality diagnosis apparatus for diagnosing an abnormality of a fuel pressure sensor for detecting a pressure of fuel supplied to a fuel injection valve of an internal combustion engine is known (see Japanese Patent Application Publication No. 2007-138774 (JP 2007-138774 A), for example). The apparatus (hereinafter referred to as "conventional apparatus") makes a provisional diagnosis that the fuel pressure sensor is abnormal when a difference between a maximum value and a minimum value of a detected value of the fuel pressure that is detected by the fuel pressure sensor (hereinafter simply referred to as "detected value") is below a predetermined value and an intermediate value between the maximum value and the minimum value is deviated by a predetermined value or more from a target value for a predetermined period.

Further, in the case where the detected value is greater than the target value when making the provisional diagnosis, the conventional apparatus decreases a fuel discharge amount of a fuel pump for supplying fuel to the fuel injection valve. On the other hand, in the case where the detected value is less than the target value when making the above provisional diagnosis, the conventional apparatus increases the fuel discharge amount of the fuel pump. In the case where a change amount of the detected value is below a predetermined amount for a predetermined period from when the fuel discharge amount is decreased or increased as such, the conventional apparatus makes a formal diagnosis that the fuel pressure sensor is abnormal.

However, in the internal combustion engine recited in JP 2007-138774 A, the fuel discharge amount of the fuel pump is feedback controlled such that the detected value coincides with the target value. Therefore, if a state where the detected value is less than the target value continues for a relatively long time, there is a possibility that the fuel discharge amount of the fuel pump reaches its maximum amount. Therefore, there is also a possibility that the fuel discharge amount of the fuel pump reaches its maximum amount and the detected value is less than the target value while the conventional apparatus makes the provisional diagnosis.

In this case, after the conventional apparatus makes the above provisional diagnosis, the fuel discharge amount cannot be increased even if it shall be increased in order to make the formal determination, and thus the conventional apparatus can not make the formal diagnosis. Therefore, in the conventional apparatus, when the fuel discharge amount of the fuel pump reaches its maximum amount and the detected value is less than the target value, it cannot diagnose the abnormality of the fuel pressure sensor.

SUMMARY OF THE INVENTION

One object of the invention is to provide a fuel pressure sensor abnormality diagnosis apparatus for an internal combustion engine, the fuel pressure sensor abnormality diagnosis apparatus being capable of diagnosing an abnormality of a fuel pressure sensor even when a fuel discharge amount of a fuel pump reaches its maximum amount and a detected value is less than a target value.

The internal combustion engine to which the fuel pressure sensor abnormality diagnosis apparatus of the first aspect of the invention is applied is equipped with a fuel supply system that includes: a fuel pump for supplying fuel to a fuel injection valve; a fuel pressure sensor for detecting a pressure of the fuel supplied from the fuel pump to the fuel injection valve; a target value setting unit for setting a target value of the pressure of the fuel supplied from the fuel pump to the fuel injection valve; and a fuel pressure feedback control unit for feedback controlling a fuel discharge amount of the fuel pump so that a detected value of the fuel pressure that is detected by the fuel pressure sensor coincides with the target value.

The fuel pressure sensor abnormality diagnosis apparatus of the first aspect comprises a fuel pressure sensor abnormality diagnosis unit for diagnosing an abnormality of the fuel pressure sensor.

As described above, when the fuel discharge amount of the fuel pump is feedback controlled so that the detected value of the fuel pressure sensor coincides with the target value, if the detected value is less than the target value, the fuel discharge amount is increased. Therefore, if the state where the detected value is less than the target value continues, then the fuel discharge amount will reach its maximum amount.

Typically, the fuel pump is configured to be able to raise the pressure of the fuel supplied to the fuel injection valve to the largest target value. Thus, if after a predetermined period has elapsed since the fuel discharge amount reaches its maximum amount, the detected value is less than the target value, the cause is in that the fuel pressure sensor is abnormal.

Therefore, the fuel pressure sensor abnormality diagnosis unit diagnoses that the fuel pressure sensor is abnormal in a case where, because the detected value is less than the target value, the fuel pressure feedback control unit increases the fuel discharge amount of the fuel pump, and as a result, the fuel discharge amount reaches a maximum amount of the fuel discharge amount of the fuel pump, and even if a first predetermined period has elapsed since the fuel discharge amount reaches the maximum amount of the fuel discharge amount of the fuel pump, the detected value is less than the target value.

Accordingly, even if the fuel discharge amount of the fuel pump reaches its maximum amount and the detected value is less than the target value, it is possible to diagnose the abnormality of the fuel pressure sensor.

Further, when a fuel pressure deviation state where the detected value is deviated by a predetermined value or more from the target value occurs, the fuel pressure feedback control unit increases or decreases the fuel discharge amount of the fuel pump so that the detected value coincides with the target value. As a result, if the fuel pressure sensor is normal, the detected value must be large and changed by a predetermined value or more toward the target value. Therefore, if the detected value does not change by the predetermined value or more toward the target value, the cause is in that the fuel pressure sensor is abnormal.

Therefore, it may be configured such that the fuel pressure sensor abnormality diagnosis unit diagnoses that the fuel pressure sensor is abnormal in a case where, although because a fuel pressure deviation state where the detected value is deviated by a first predetermined value or more from the target value occurs, the fuel pressure feedback control unit controls the fuel discharge amount of the fuel pump, even if a second predetermined period has elapsed since the fuel pressure deviation state occurs, the detected value does not change by a second predetermined value or more toward the target value.

Further, it may be configured such that in a case where, when the fuel discharge amount of the fuel pump does not reach the maximum amount of the fuel discharge amount of the fuel pump, the fuel pressure deviation state does not occur during a third predetermined period or longer, the fuel pressure sensor abnormality diagnosis unit increases or decreases the target value by the first predetermined value or more such that the fuel pressure deviation state occurs.

Accordingly, even if the fuel pressure deviation state does not occur during a predetermined period or longer and thus the abnormality diagnosis of the fuel pressure sensor cannot be made, it is possible to diagnose the abnormality of the fuel pressure sensor.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 16 is a flowchart showing an abnormality diagnosis routine that is executed by the CPU of the ECU shown in FIG. 1.

DETAILED DESCRIPTION OF EMBODIMENTS

Hereinafter, a fuel pressure sensor abnormality diagnosis apparatus for an internal combustion engine according to an embodiment of the invention (hereinafter referred to as "the diagnosis apparatus") will be described with reference to the drawings.

<Configuration>

Figure 1:
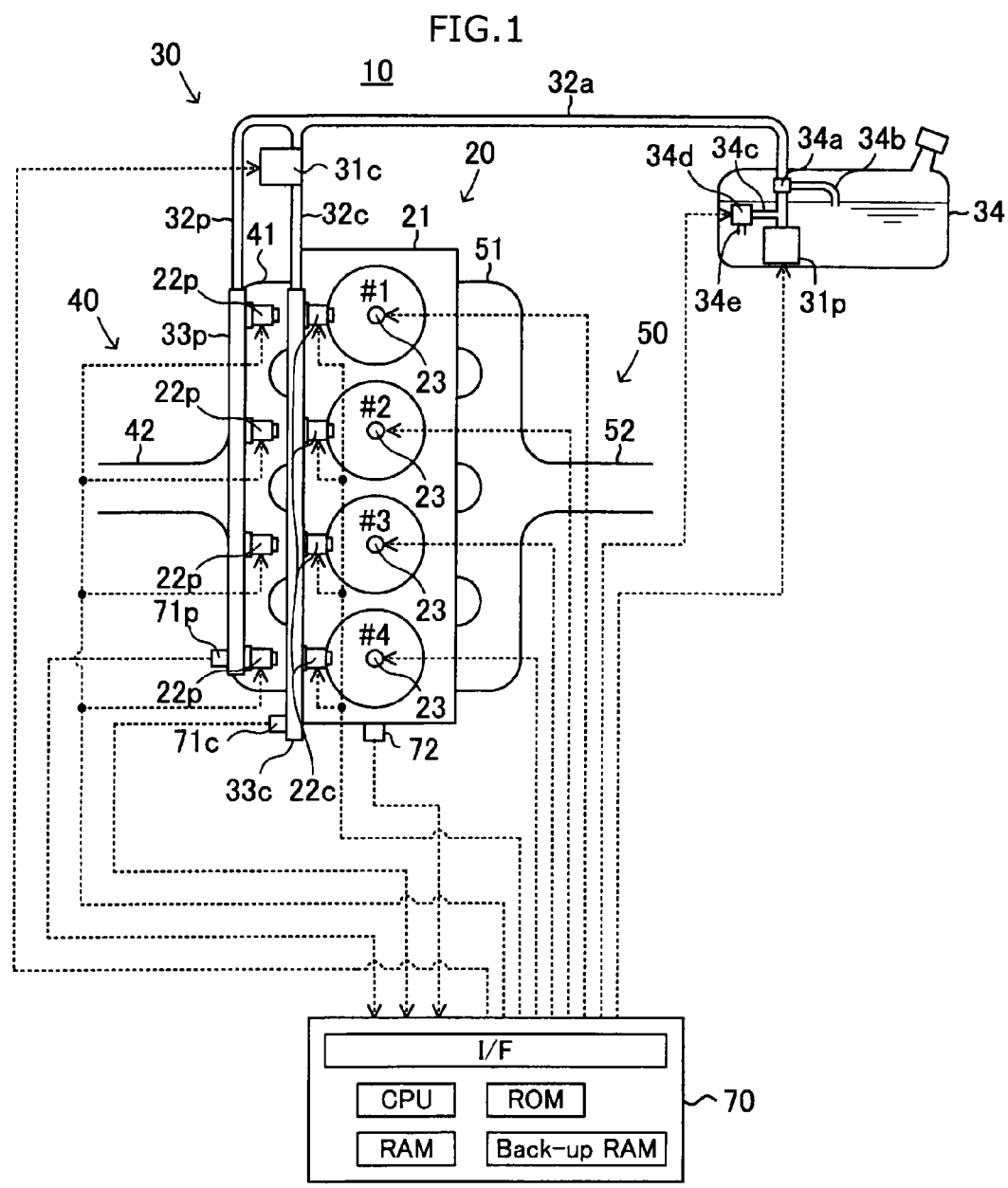
FIG. 1 is an overall view of an internal combustion engine to which a fuel pressure sensor abnormality diagnosis apparatus according to an embodiment of the invention is applied.

The diagnosis apparatus is applied to an internal combustion engine 10 shown in FIG. 1. The engine 10 is a multi-cylinder (in this example, inline four-cylinder), four-cycle piston reciprocation gasoline engine. The engine 10 includes an engine body section 20, a fuel supply system 30, an intake system 40 and an exhaust system 50.

The engine body section 20 includes a body 21 that has a cylinder block, a cylinder head, a crankcase and the like. The body 21 is formed with four cylinders (combustion chambers) #1 to #4. The cylinder head is provided with a fuel injection valve (hereinafter referred to as "in-cylinder injection valve") 22c for injecting fuel into the cylinders #1 to #4. Further, the cylinder head is provided with a fuel injection valve (hereinafter referred to as "port injection valve") 22p for injecting fuel into an intake port (not shown) that is disposed to correspond to each of the cylinders #1 to #4.

The fuel injection valves 22c and 22p are adapted to be opened and inject the fuel in response to an instruction of an engine ECU (electronic control unit) 70 as described below.

Further, the cylinder head is provided with ignition units 23 that are disposed to correspond to the cylinders #1 to #4. Each of the ignition units 23 includes an igniter having an ignition coil for generating a high voltage and a spark plug. The igniter is adapted to generate the high voltage with the ignition coil in response to an instruction of the ECU 70 as described below. This high voltage is applied to the spark plug, and a spark is generated by the spark plug.

The fuel supply system 30 includes two fuel pumps 31p and 31c, three fuel delivery pipes 32a, 32c and 32p, two delivery pipes (pressure accumulation chamber) 33c and 33p, as well as a fuel tank 34. The fuel delivery pipe 32a connects the fuel pump 31p with the fuel delivery pipes 32c and 32p. The fuel delivery pipe 32c connects the fuel delivery pipe 32a with the delivery pipe 33c. The fuel delivery pipe 32p connects the fuel delivery pipe 32a with the delivery pipe 33p. Hereinafter, the delivery pipe 33c is referred to as "high pressure delivery pipe", and the delivery pipe 33p is referred to as "low pressure delivery pipe".

The fuel pump 31p is disposed in the fuel tank 34. The fuel pump 31p is driven by an electric motor that operates in response to an instruction of the ECU 70 as described below to discharge the fuel stored in the fuel tank 34 to the fuel delivery pipe 32a. The discharged fuel flows into the fuel delivery pipes 32c and 32p through the fuel delivery pipe 32a. Hereinafter, the fuel pump 31p is referred to as "low pressure pump".

The fuel that has flowed into the fuel delivery pipe 32c flows into the fuel pump 31c that is interposed in the fuel delivery pipe 32c. The fuel pump 31c is driven by a rotational force of a camshaft (not shown) as a driving force to further pressurize the fuel that has flowed into the fuel pump 31c and discharge it to the fuel delivery pipe 32c at its downstream side. The fuel that is discharged from the fuel pump 31c flows into the high pressure delivery pipe 33c through the fuel delivery pipe 32c. The high pressure delivery pipe 33c is connected to the in-cylinder injection valve 22c.

On the other hand, the fuel that has flowed into the fuel delivery pipe 32p flows into the low pressure delivery pipe 33p through the fuel delivery pipe 32p. The low pressure delivery pipe 33p is connected to the port injection valves 22p.

Further, a relief valve 34a is interposed in the fuel delivery pipe 32a in the fuel tank 34. The relief valve 34a is opened by a pressure of the fuel in the fuel delivery pipe 32a when it reaches a predetermined pressure. In this example, the predetermined pressure is set at a pressure higher than a pressure of a maximum value Pfp_max as described below.

When the relief valve 34a is opened, a part of the fuel that has been discharged to the fuel delivery pipe 32a from the low pressure pump 31p returns into the fuel tank 34 through the relief valve 34a and a relief tube 34b that is connected to the relief valve 34a.

Further, a part of the fuel delivery pipe 32a that is located between the low pressure pump 31p and the relief valve 34a is connected to a reduction valve 34d by a fuel pipe 34c in the fuel tank 34. One end of a fuel pipe 34e is connected to the reduction valve 34d and the other end is open to the fuel tank 34. The reduction valve 34d is opened in response to an instruction of the ECU 70 as described below to return a part of the fuel that has been discharged from the low pressure pump 31p back into the fuel tank 34 through the fuel pipe 34e.

The intake system 40 includes an intake manifold 41 and an intake pipe 42. The intake manifold 41 includes branches that are connected to the cylinders #1 to #4 through an intake port (not shown) and a convergence portion that converges the branches. The intake pipe 42 is connected to the convergence portion of the intake manifold 41. The intake manifold 41 and the intake pipe 42 constitute an intake passage.

The exhaust system 50 includes an exhaust manifold 51 and an exhaust pipe 52. The exhaust manifold 51 includes branches that are connected to the cylinders #1 to #4 through an exhaust port (not shown) and a convergence portion that converges the branches. The exhaust pipe 52 is connected to the convergence portion of the exhaust manifold 51. The exhaust manifold 51 and the exhaust pipe 52 constitute an exhaust passage.

The ECU 70 is an well-known electronic circuit of a microcomputer, including a CPU, a ROM, a RAM, a backup RAM, an interface and the like. The ECU 70 can be connected with the sensors as described below and is adapted to receive (input) signals from these sensors. Further, the ECU 70 is adapted to deliver an indication (drive) signals to various actuators (the fuel injection valves 22c and 22p and the like).

The ECU 70 is connected to a high pressure side fuel pressure sensor 71c, a low pressure side fuel pressure sensor 71p and a crank angle sensor 72.

The high pressure side fuel pressure sensor 71c is a sensor of a type that detects a deformation amount of a diaphragm by a piezoelectric element and is disposed in the high pressure delivery pipe 33c. The high pressure side fuel pressure sensor 71c measures a pressure of the fuel in the high pressure delivery pipe 33c, and outputs a signal indicating the pressure of the fuel (fuel pressure) Pfc.

On the other hand, the low pressure side fuel pressure sensor 71p is a sensor of a type that detects a deformation amount of a diaphragm by a piezoelectric element and is disposed in the low pressure delivery pipe 33p. The fuel pressure sensor 71p measures a pressure of the fuel in the low pressure delivery pipe 33p, and outputs a signal indicating the pressure of the fuel (fuel pressure) Pfp. In this example, as described later, the diagnosis apparatus diagnose whether or not the low pressure side fuel pressure sensor 71p is abnormal.

The crank angle sensor 72 is disposed in the engine body section 20. The crank angle sensor 72 outputs a signal corresponding to a rotational position (i.e., crank angle) of a crankshaft (not shown) of the engine 10. The ECU 70 obtains a crank angle (absolute crank angle) of the engine 10 by taking a predetermined compression top dead center of cylinder as a reference based on signals from the crank angle sensor 72 and a cam position sensor (not shown). Further, the ECU 70 obtains an engine rotation speed NE based on the signal from the crank angle sensor 72.

Further, in this example, the ECU 70 receives detection signals from engine operation state amount sensors or the like (not shown), such as, an accelerator operation amount sensor for detecting an operation amount of an accelerator pedal, an ignition switch sensor for detecting an on-off state of an ignition switch, an air flow meter for detecting an amount of air that is suck into the cylinders #1 to #4, a temperature sensor for detecting temperature of air that is suck into the cylinders #1 to #4, a temperature sensor for detecting temperature of cooling water for cooling the engine 10, and an air-fuel ratio sensor for detecting an air-fuel ratio of exhaust gas that is discharged from the cylinders #1 to #4 (oxygen sensor).

<Fuel Pressure Control>

Figure 2:
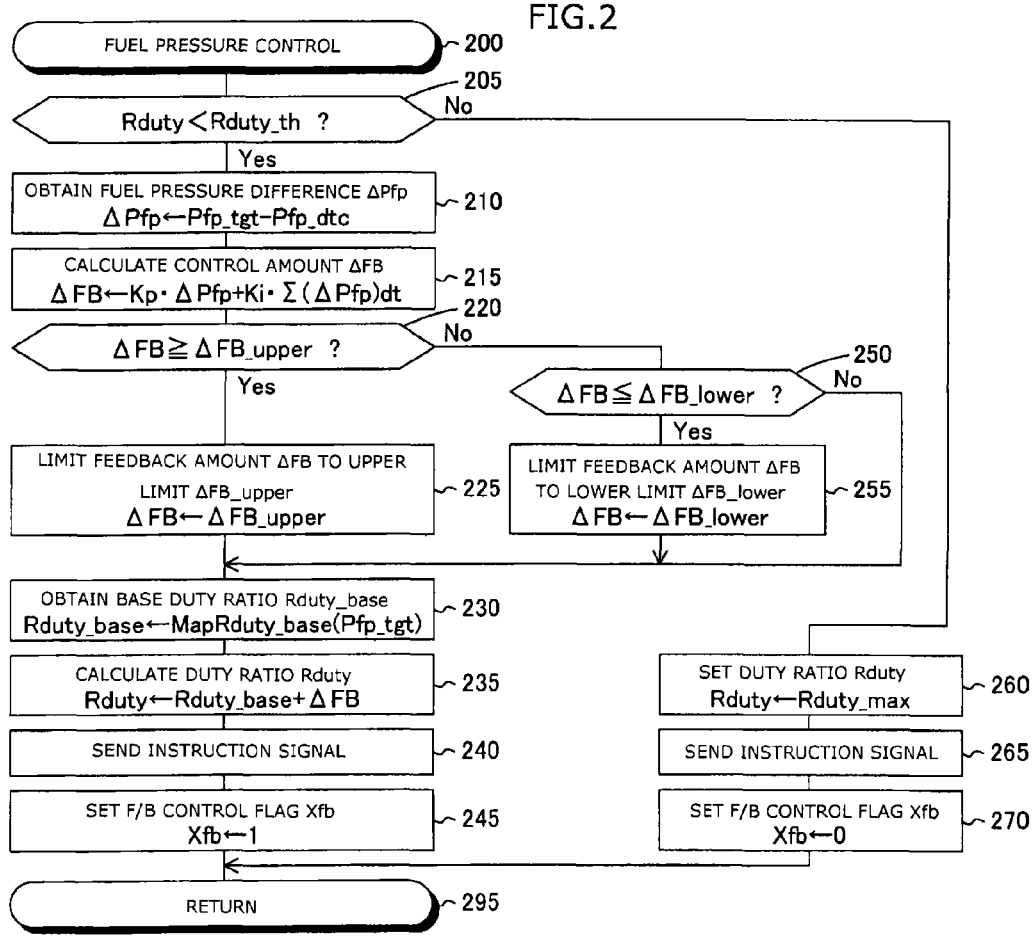
FIG. 2 is a flowchart showing a fuel pressure control routine that is executed by a CPU of an ECU shown in FIG. 1.

Next, a control of the pressure of the fuel (fuel pressure) Pfp in the low pressure delivery pipe 33p will be described with reference to FIG. 2. The CPU of the ECU 70 is adapted to execute a fuel pressure control routine shown by the flowchart in FIG. 2 at a predetermined interval.

Therefore, the CPU starts the routine from step 200 of FIG. 2 at a predetermined timing and proceeds to step 205, in which it determines whether a duty ratio Rduty for controlling electric power supply to an electric motor driving the low pressure pump 31p at this time (hereinafter simply referred to as "duty ratio") is less than a predetermined value Rduty_th. In this example, the greater the duty ratio Rduty is, the greater the fuel discharge amount per unit time of the low pressure pump 31p is.

When the CPU executes step 205, if the duty ratio Rduty is less than the predetermined value Rduty_th, the CPU determines "Yes" in this step 205, and sequentially executes step 210 and step 215 which will be described later. Then, the CPU proceeds to step 220.

Step 210: the CPU obtains a deviation (fuel pressure difference) ΔPfp (ΔPfp=Pfp_tgt−Pfp_dtc) of a detected value Pfp_dtc of the fuel pressure detected by the low pressure side fuel pressure sensor 71p from a target value Pfp_tgt that is set as described later.

Step 215: the CPU calculates a feedback amount ΔFB according to the following equation (1). In the equation (1), ΔPfp is the fuel pressure difference that is obtained in step 210, Kp is a proportional coefficient in a PI control, and Ki is an integral coefficient in the PI control. In addition, the feedback amount ΔFB may take not only a positive value but also a negative value.

$$\Delta FB = Kp \cdot \Delta Pfp + Ki \cdot \Sigma(\Delta Pfp)dt \qquad (1)$$

After the CPU proceeds to step 220, it determines whether the feedback amount ΔFB is above an upper limit value ΔFB_upper. Further, the upper limit value ΔFB_upper is a positive value.

When the CPU executes step 220, if the feedback amount ΔFB is above the upper limit value ΔFB_upper, the CPU determines "Yes" in this step 220, and sequentially executes step 225 to step 245 which will be described later. Then, the CPU proceeds to step 295 and ends the routine temporarily.

Step 225: the CPU limits the feedback amount ΔFB to its upper limit value ΔFB_upper.

Step 230: the CPU obtains a base duty ratio Rduty_base by applying the target value Pfp_tgt at this time to a look-up table MapRduty (Pfp_tgt). The greater the target value Pfp_tgt is, the greater the base duty ratio Rduty_base that is obtained from the look-up table MapRduty (Pfp_tgt) is.

Step 235: the CPU calculates the duty ratio Rduty according the following equation (2).

$$Rduty = Rduty\_base + \Delta FB \qquad (2)$$

Step 240: the CPU sends an instruction signal for supplying electric power that is based on the calculated duty ratio Rduty in step 235 to the electric motor. Step 245: the CPU inputs "1" to a feedback control flag Xfb indicating that a fuel pressure feedback control is being executed. In this routine, the process of step 210 to step 240 and step 250 to step 255 corresponds to the feedback control of the fuel pressure Pfp (fuel pressure feedback control).

In contrast, when the CPU executes step 220, if the feedback amount ΔFB is less than the upper limit value ΔFB_upper, the CPU determines "No" in this step 220 and proceeds to step 250, in which it determines whether the feedback amount ΔFB is below a lower limit value ΔFB_lower. The lower limit value ΔFB_lower is a negative value.

When the CPU executes step 250, if the feedback amount ΔFB is below the lower limit value ΔFB_lower, it sequentially executes step 255 which will be described later and step 230 to step 245 that have been described previously. Then, the CPU proceeds to step 295 and ends the routine temporarily.

Step 255: the CPU limits the feedback amount ΔFB to its lower limit value ΔFB_lower.

In contrast, when the CPU executes step 250, if the feedback amount ΔFB is greater than the lower limit value ΔFB_lower, it sequentially executes step 230 to step 245 that have been described previously. Then, the CPU proceeds to step 295 and ends the routine temporarily.

On the other hand, when the CPU executes step 205, if the duty ratio Rduty is above the predetermined value Rduty_th, the CPU determines "No" in this step 205 and sequentially executes step 260 to step 270 which will be described later. Then, the CPU proceeds to step 295 and ends the routine temporarily.

Step 260: the CPU sets the duty ratio Rduty to a maximum duty ratio Rduty_max. The maximum duty ratio Rduty_max is greater than the predetermined value Rduty_th. Step 265: the CPU sends an instruction signal for supplying electric power that is based on the set duty ratio Rduty (maximum duty ratio Rduty_max) in step 250 to the electric motor. In this case, when the duty ratio Rduty is the maximum duty ratio Rduty_max, the fuel discharge amount of the low pressure pump 31p is at its maximum amount. Step 270: the CPU inputs "0" to the feedback control flag Xfb. In this routine, the process of step 260 and step 265 corresponds to an open loop control.

In this case, when the duty ratio Rduty is above the predetermined value Rduty_th, the output of the electric motor is substantially equal to the output of the electric motor when the duty ratio Rduty is the maximum duty ratio Rduty_max. Therefore, when the duty ratio Rduty is above the predetermined value Rduty_th, the duty ratio Rduty is set to the maximum duty ratio Rduty_max in step 260. Therefore, in this example, the predetermined value Rduty_th is set to a value such that the output of the electric motor when the duty ratio Rduty is above the predetermined value Rduty_th is substantially equal to the output of the electric motor when the duty ratio Rduty is the maximum duty ratio Rduty_max.

The above is a routine for controlling the pressure of the fuel (fuel pressure) Pfp in the low pressure delivery pipe 33p.

<Target Value Setting>

Next, setting the target value Pfp_tgt of the fuel pressure Pfp in the low pressure delivery pipe 33p will be described with reference to FIG. 3. The CPU is adapted to execute a target value setting routine shown by the flowchart in FIG. 3 at a predetermined interval.

Figure 3:
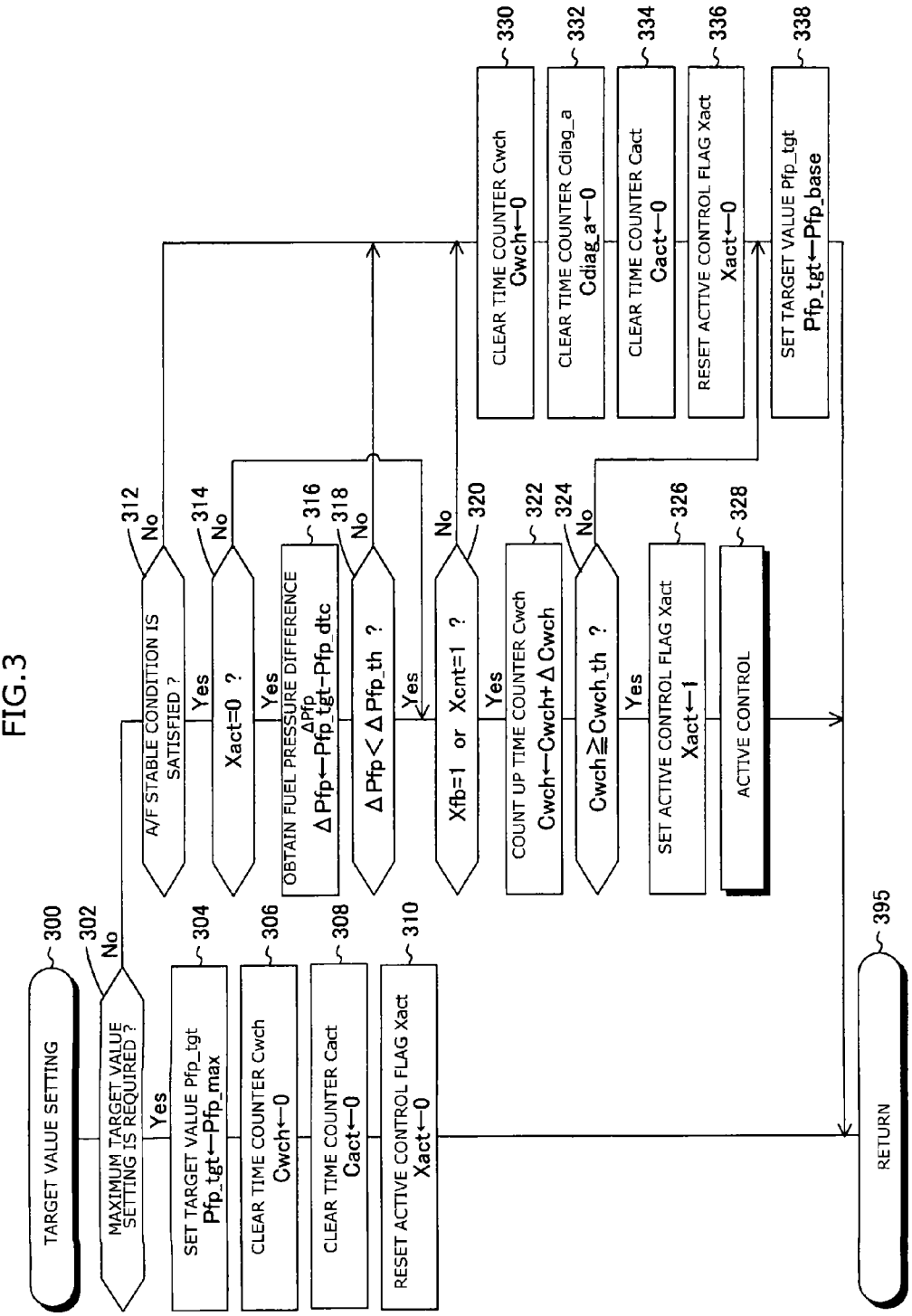
FIG. 3 is a flowchart showing a target value setting routine that is executed by the CPU of the ECU shown in FIG. 1.

Therefore, the CPU starts the routine from step 300 of FIG. 3 at a predetermined timing and proceeds to step 302, in which it determines whether a maximum target value setting that shall set the maximum value Pfp_max to the target value Pfp_tgt is required. In this example, the temperature of the engine 10 (the temperature of the cooling water for cooling the engine 10) is relatively high when the operation of the engine 10 is started, and as a result, if there is a possibility that the fuel in the low pressure delivery pipe 33p is boiling, the maximum target value setting is required. In addition, even when it is necessary to reduce a generation amount of unburned hydrocarbons in the cylinders #1 to #4, the maximum target value setting is required. These requirements are generated based on output values of the above engine operation state amount sensors.

When the CPU executes step 302, if the maximum target value setting is required, the CPU determines "Yes" in this step 302 and sequentially executes step 304 to step 310 which will be described later. Then, the CPU proceeds to step 395 and ends the routine temporarily.

Step 304: the CPU sets the maximum value Pfp_max to the target value Pfp_tgt.

Step 306: the CPU clears an active control permission time counter Cwch. The time counter Cwch is a counter that indicates the time during which the operation state of the engine 10 is in a state where an active control which will be described later shall be permitted. When the CPU proceeds to this step 306, the operation state of the engine 10 is in a state where the maximum value Pfp_max shall be set to the target value Pfp_tgt, and therefore is not in the state where the active control shall be permitted. For this reason, the CPU clears the active control permission time counter Cwch in this step 306.

Figure 5:
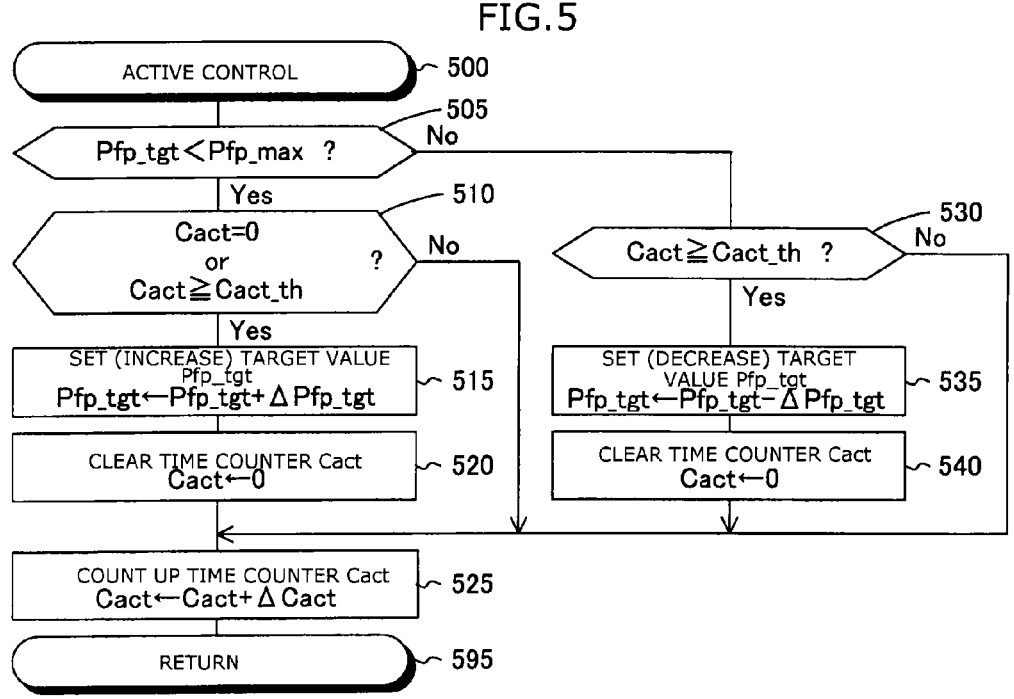
FIG. 5 is a flowchart showing an active control routine that is executed by the CPU of the ECU shown in FIG. 1.

Step 308: the CPU clears an active control time counter Cact. The time counter Cact is a counter indicating the time that has elapsed since the target value Pfp_tgt is increased or decreased by the active control which will be described later and is counted up in the routine shown in FIG. 5. If the CPU proceeds to step 308, as described above, the operation state of the engine 10 is in the state where the maximum value Pfp_max shall be set to the target value Pfp_tgt, and therefore is not in the state where the active control shall be permitted. Therefore, at this time, the active control is not executed. Therefore, it is not necessary to measure the time that has elapsed since the target value Pfp_tgt is increased or decreased by the active control. Further, the active control time counter Cact shall be also cleared previously for measuring the time that has elapsed since the target value Pfp_tgt is increased or decreased by the active control. Thus, the CPU clears the active control time counter Cact in this step 315.

Step 310: the CPU inputs "0" to an active control flag Xact. The flag Xact is a flag indicating that the active control which will be described later is executed. As can be seen from above, when the CPU proceeds to step 310, the active control is not executed. For this reason, the CPU inputs "0" to the active control flag Xact in this step 310.

In contrast, when the CPU executes step 302, if the maximum target value setting is required, the CPU determines "No" in this step 302 and proceeds to step 312, in which it determines whether an air-fuel ratio stable condition is satisfied.

The air-fuel ratio stable condition is satisfied when learning of a well-known correction factor of fuel injection amount that is used for compensating an error among fuel injection amounts from the fuel injection valves 22c and 22p that is generated due to individual difference of the fuel injection valves 22c and 22p has been completed. In other words, the air-fuel ratio stable condition is a condition that can well control an air-fuel ratio of mixture formed in each of the cylinders #1 to #4 to be a target air-fuel ratio even when the target value Pfp_tgt is increased or decreased by the active control that is executed in step 328 which will be described later.

When the CPU executes step 312, if the air-fuel ratio stable condition is satisfied, the CPU determines "Yes" in this step 312 and proceeds to step 314, in which it determines whether a value of the active control flag Xact is "0". If the value of the active control flag Xact is "1", the CPU determines "No" in this step 314 and proceeds to step 320.

In contrast, when the CPU executes step 314, if the value of the active control flag Xact is "0", the CPU determines "Yes" in this step 314 and executes step 316 which will be described later. Then, the CPU proceeds to step 318.

Step 316: the CPU obtains an absolute value of a difference between the detected value Pfp_dtc of the fuel pressure that is detected by the low pressure side fuel pressure sensor 71p at this time and the target value Pfp_tgt at this time (fuel pressure difference) $\Delta Pfp$ ($\Delta Pfp=|Pfp\_tgt-Pfp\_dtc|$).

After the CPU proceeds to step 318, it determines whether the fuel pressure difference $\Delta Pfp$ is less than a fuel pressure difference threshold $\Delta Pfp\_th$. In this example, the fuel pressure difference threshold $\Delta Pfp\_th$ is set to a value such that when the low pressure side fuel pressure sensor 71p is normal, the detected value Pfp_dtc is changed (increased or decreased) enough by a change amount threshold $\Delta Pfp\_chg\_th$ which will be described later from when the detected value Pfp_dtc is deviated from the target value Pfp_tgt (the detected value Pfp_dtc is larger or less than the target value Pfp_tgt) until a predetermined period Tdiag_a_th which will be described later has elapsed.

When the CPU executes step 318, if the fuel pressure difference $\Delta Pfp$ is less than the fuel pressure difference threshold $\Delta Pfp\_th$, the CPU determines "Yes" in this step 318 and proceeds to step 320.

After the CPU proceeds to step 320, it determines whether any one of the feedback control flag Xfb and an active control continuation flag Xcnt is "1". The feedback control flag Xfb is a flag indicating whether a feedback control of the pressure of the fuel (fuel pressure) Pfp in the low pressure delivery pipe 33p is being executed, and is set by the routine shown in FIG. 2 as described above. The active control continuation flag Xcnt is a flag indicating whether to continue the active control, and is set by the routine shown in FIG. 6 which will be described later.

When the CPU executes step 320, if either one of the feedback control flag Xfb and the active control continuation flag Xcnt has a value of "1", the CPU determines "Yes" in this step 320, and executes step 322 which will be described later. Then, the CPU proceeds to step 324.

Step 322: the CPU counts up the active control permission time counter Cwch by a predetermined value $\Delta Cwch$. The predetermined value $\Delta Cwch$ is a value corresponding to the time interval at which the routine is executed.

After the CPU proceeds to step 324, it determines whether the active control permission time counter Cwch has the predetermined value Cwch_th or more. If the time counter Cwch has the predetermined value Cwch_th or more, the CPU determines "Yes" in this step 324 and sequentially executes step 326 and step 328 which will be described later. Then, the CPU proceeds to step 395 and ends the routine temporarily.

As described previously, the active control permission time counter Cwch is a counter indicating the time during which the operation state of the engine 10 is in the state where the active control shall be permitted, and in this example, the predetermined value Cwch_th as described above is a value corresponding to a sufficient but not excessive period during which it is in the state where the active control shall be permitted.

Step 326: the CPU inputs "1" to the active control flag Xact. Step 328: the CPU executes the active control routine shown by the flowchart in FIG. 5.

On the other hand, when the CPU executes step 324, if the active control permission time counter Cwch is less than the predetermined value Cwch_th, the CPU determines "No" in this step 324, and executes step 338 which will be described later. Then, the CPU proceeds to step 395 and ends the routine temporarily.

Step 338: the CPU sets a reference value Pfp_base to the target value Pfp_tgt.

On the other hand, when the CPU executes step 312, if the air-fuel ratio stable condition is not satisfied, the CPU determines "No" in this step 312 and sequentially executes step 330 to step 336 which will be described later and step 338 as described above. Then, the CPU proceeds to step 395 and ends the routine temporarily.

Step 330: the CPU clears the active control permission time counter Cwch. Step 332: the CPU clears an abnormality diagnosis time counter Cdiag_a. Step 334: the CPU clears the active control time counter Cact. Step 336: the CPU inputs "0" to the active control flag Xact.

Further, when the CPU executes step 318, if the fuel pressure difference $\Delta Pfp$ is above the fuel pressure difference threshold ΔPfp_th, the CPU determines "No" in this step 318, and sequentially executes step 330 to step 338 as described above. Then, the CPU proceeds to step 395 and ends the routine temporarily.

In addition, when the CPU executes step 320, if each of the feedback control flag Xfb and the active control continuation flag Xcnt has a value of "0", the CPU determines "No" in this step 320, and sequentially executes step 330 to step 338 as described above. Then, the CPU proceeds to step 395 and ends the routine temporarily.

The above is a routine for setting the target value Pfp_tgt of the pressure of the fuel (fuel pressure) Pfp in the low pressure delivery pipe 33p.

<Outline of Active Control>

Next, an outline of the active control which is executed in step 328 of the routine shown in FIG. 3 will be described with reference to FIG. 4.

According to the active control of the present embodiment, when the target value Pfp_tgt has not reached the maximum value Pfp_max, the target value Pfp_tgt is increased by a predetermined value ΔPfp_tgt. On the other hand, when the target value Pfp_tgt has reached the maximum value Pfp_max, the target value Pfp_tgt is decreased by the predetermined value ΔPfp_tgt. In this example, the predetermined value ΔPfp_tgt is set such that when the low pressure side fuel pressure sensor 71p is normal, the detected value Pfp_dtc is changed (increased or decreased) enough by the change amount threshold ΔPfp_chg_th which will be described later from when the target value Pfp_tgt is changed (increased or decreased) by the predetermined value ΔPfp_th until a predetermined period Tact_th which will be described later has elapsed.

Figure 4:
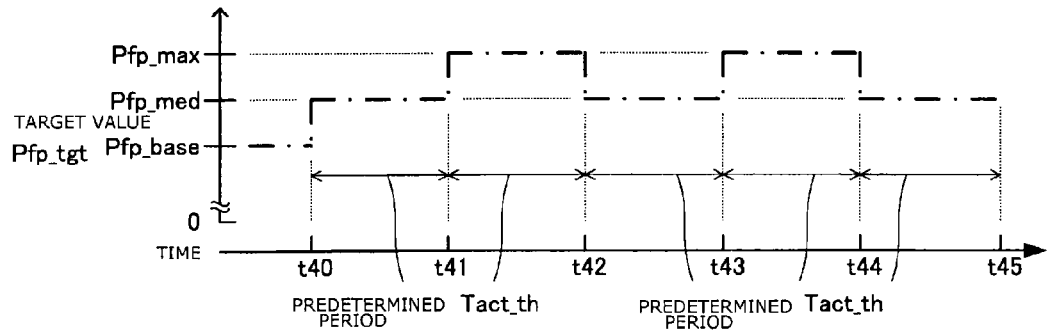
FIG. 4 is a time chart showing a change in a fuel pressure target value that is caused by an active control.

For example, according to the active control, in the case where the target value Pfp_tgt is the reference value Pfp_base when the control is started, the target value Pfp_tgt is set as shown in FIG. 4. That is, in the example shown in FIG. 4, at time t40 when the active control is started, the reference value Pfp_base is set to the target value Pfp_tgt, and thus the target value Pfp_tgt is less than the maximum value Pfp_max. Therefore, at this time t40, the ECU 70 forms an intermediate value Pfp_med by increasing the target value Pfp_tgt by the predetermined value ΔPfp_tgt. This increased target value Pfp_tgt is maintained over the predetermined period Tact_th. In this example, the predetermined period Tact_th is set to a sufficient but not excessive period from when the target value Pfp_tgt is changed (increased or decreased) by the predetermined value ΔPfp_th, during which the detected value Pfp_dtc is changed (increased or decreased) by the change amount threshold ΔPfp_chg_th which will be described later when the low pressure side fuel pressure sensor 71p is normal.

Further, at time t41 after the predetermined period Tact_th has elapsed from time t40, the target value Pfp_tgt is less than the maximum value Pfp_max. Therefore, at this time t41, the ECU 70 forms the maximum value Pfp_max by increasing the target value Pfp_tgt by the predetermined value ΔPfp_tgt. The increased target value Pfp_tgt is also maintained over the predetermined period Tact_th.

Further, at time t42 after the predetermined period Tact_th has elapsed from time t41, the target value Pfp_tgt has reached the maximum value Pfp_max. Therefore, at this time t42, the ECU 70 forms the intermediate value Pfp_med by decreasing the target value Pfp_tgt by the predetermined value ΔPfp_tgt. The decreased target value Pfp_tgt is also maintained over the predetermined period Tact_th.

Further, at time t43 after the predetermined period Tact_th has elapsed from time t42, the target value Pfp_tgt is less than the maximum value Pfp_max. Therefore, at this time t43, the ECU 70 forms the maximum value Pfp_max by increasing the target value Pfp_tgt by the predetermined value ΔPfp_tgt. The increased target value Pfp_tgt is also maintained over the predetermined period Tact_th.

Further, at time t44 after the predetermined period Tact_th has elapsed from time t43, the target value Pfp_tgt has reached the maximum value Pfp_max. Therefore, at this time t44, the ECU 70 forms the intermediate value Pfp_med by decreasing the target value Pfp_tgt by the predetermined value ΔPfp_tgt. The decreased target value Pfp_tgt is also maintained over the predetermined period Tact_th.

This active control is a control that is executed in order to make an abnormality diagnosis of the low pressure side fuel pressure sensor 71p which will be described later. Therefore, in the abnormality diagnosis of the low pressure side fuel pressure sensor 71p which will be described later, the active control is continued until one of the formal diagnosis (formal determination) that the low pressure side fuel pressure sensor 71p is abnormal and the formal diagnosis (formal determination) that the low pressure side fuel pressure sensor 71p is normal is made.

<Specific Active Control>

Next, the active control will be explained specifically. When proceeding to step 328 in FIG. 3, the CPU is adapted to execute an active control routine shown by the flowchart in FIG. 5. Therefore, when proceeding to step 328 in FIG. 3, the CPU starts the routine from step 500 of FIG. 5 and proceeds to step 505, in which it determines whether the target value Pfp_tgt at this time is less than the maximum value Pfp_max. If the target value Pfp_tgt at this time is less than the maximum value Pfp_max, the CPU determines "Yes" in this step 505 and proceeds to step 510, in which it determines whether the active control time counter Cact has a value of "0" or whether the time counter Cact has a predetermined value Cact_th or more.

The active control time counter Cact is a counter indicating the time that has elapsed since the target value Pfp_tgt is increased or decreased after the active control is started by this routine. Further, the predetermined value Cact_th is a value corresponding to the predetermined period Tact_th.

When the CPU executes step 510, if the active control time counter Cact has a value of "0" or the time counter Cact has the predetermined value Cact_th or more, the CPU sequentially executes step 515 to step 525 which will be described later. Then, the CPU proceeds to step 595 and ends the routine temporarily.

Step 515: the CPU sets a value that is obtained by increasing the target value Pfp_tgt at this time by the predetermined value ΔPfp_tgt to the target value Pfp_tgt. Step 520: the CPU clears the active control time counter Cact. Step 525: the CPU counts up the active control time counter Cact by a predetermined value ΔCact. The predetermined value ΔCact is a value corresponding to the time interval at which the routine is executed.

In contrast, when the CPU executes step 510, if the active control time counter Cact does not have a value of "0" and the time counter Cact has a value less than the predetermined value Cact_th, the CPU determines "No" in this step 510 and executes step 525 as described above. Then, the CPU proceeds to step 595 and ends the routine temporarily.

On the other hand, when the CPU executes step 505, if the target value Pfp_tgt at this time is the maximum value Pfp_max or more, the CPU determines "No" in this step 505 and proceeds to step 530, in which it determines whether the active control time counter Cact has a value of the predetermined value Cact_th or more. If the active control time counter Cact has a value of the predetermined value Cact_th or more, the CPU determines "Yes" in this step 530 and sequentially executes step 535 and step 540 which will be described later and step 525 as described above. Then, the CPU proceeds to step 595 and ends the routine temporarily.

Step 535: the CPU sets a value that is obtained by decreasing the target value Pfp_tgt at this time by the predetermined value ΔPfp_tgt to the target value Pfp_tgt.

Step 540: the CPU clears the active control time counter Cact.

In contrast, when the CPU executes step 530, if the active control time counter Cact has a value less than the predetermined value Cact_th, the CPU determines "No" in this step 530 and executes step 525 as described above. Then, the CPU proceeds to step 595 and ends the routine temporarily.

The above is the specific active control.

Nest, setting of the active control continuation flag Xcnt that is mentioned in the explanation of step 320 of FIG. 3 will be described.

When the target value Pfp_tgt is increased by the active control, the duty ratio Rduty is increased by the fuel pressure feedback control as described above (see FIG. 2) in order to increase an actual fuel pressure Pfp_actual such that the detected value Pfp_dtc coincides with the target value Pfp_tgt.

In this case, if the original detected value Pfp_dtc is relatively large (that is, the original fuel pressure is relatively high), the duty ratio Rduty after being increased may be made to be the maximum duty ratio Rduty_max. In this case, since the fuel pressure feedback control is not executed, according to the routine shown in FIG. 2, "0" is input to the feedback control flag Xfb. In this case, if there is no determination whether the active control continuation flag Xcnt has a value of "1" in step 320 of FIG. 3, it is determined "No" in this step 320. As a result, the active control will not be executed.

However, the active control is a control that is required for diagnosing the abnormality in the low pressure side fuel pressure sensor 71p which will be described later. Thus, if the active control is not executed, it is not possible to diagnose the abnormalities in the low pressure side fuel pressure sensor 71p.

On the other hand, although the duty ratio Rduty is made to be the maximum duty ratio Rduty_max by the active control, if the active control is continued, the target value Pfp_tgt may be decreased. In this case, the detected value Pfp_dtc becomes greater than the target value Pfp_tgt, and the duty ratio Rduty is no longer the maximum duty ratio Rduty_max (becomes less than the predetermined value Rduty_th), and there is a possibility that the fuel pressure feedback control is restarted. In this case, it is possible to diagnose the abnormality in the low pressure side fuel pressure sensor 71p based on the change amount of the detected value Pfp_dtc after the target value Pfp_tgt is decreased.

Therefore, in the viewpoint of executing more abnormality diagnosis of the low pressure side fuel pressure sensor 71p, even when the feedback control flag Xfb has a value of "0" by the active control, the active control is preferably continued.

Therefore, in this embodiment, even if the duty ratio Rduty is made to be the maximum duty ratio Rduty_max by the active control and "0" is input to the feedback control flag Xfb, the active control is continued, and the abnormality in the low pressure side fuel pressure sensor 71p is diagnosed.

Figure 6:
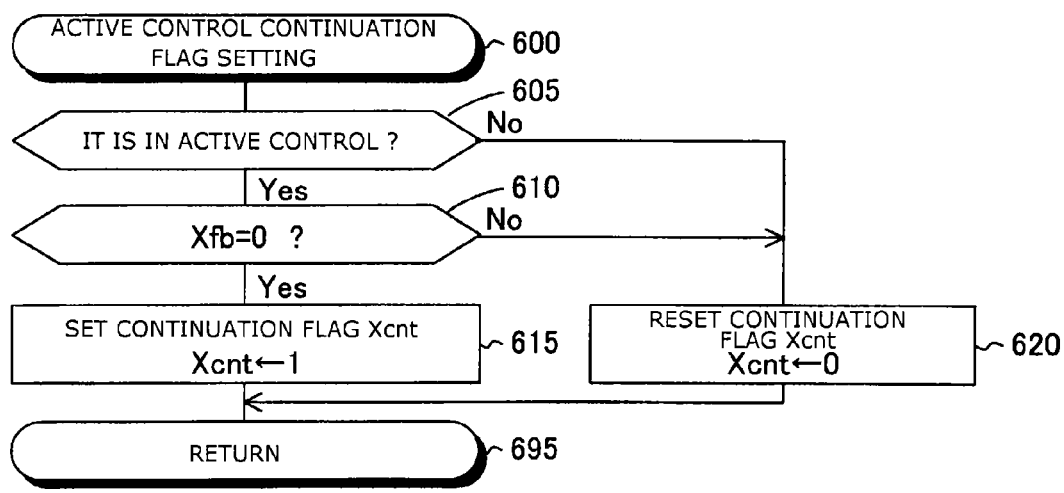
FIG. 6 is a flowchart showing an active control continuation flag setting routine that is executed by the CPU of the ECU shown in FIG. 1.
Figure 7:
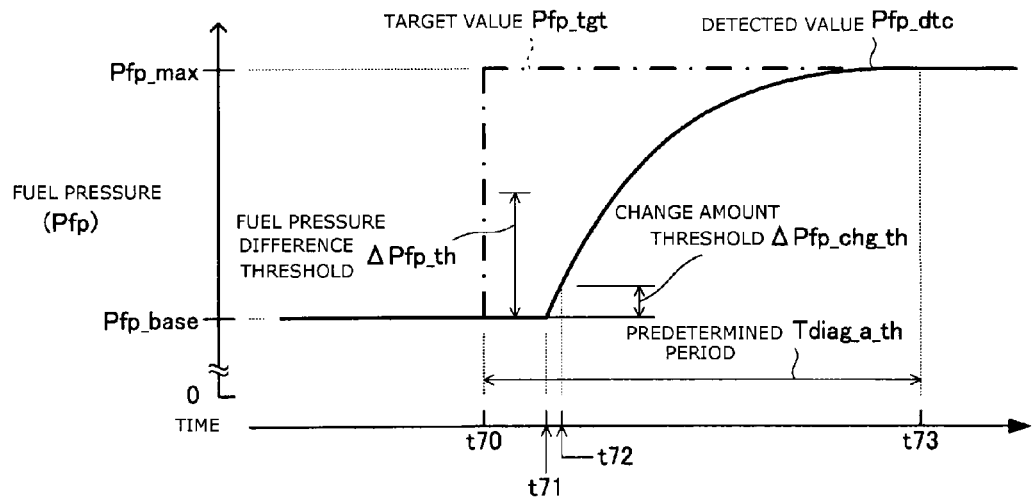
FIG. 7A is a time chart showing a change in a detected value of a fuel pressure sensor when the fuel pressure sensor is normal.
FIG. 7B is a time chart showing a change in the detected value of the fuel pressure sensor when the fuel pressure sensor is abnormal.
Figure 7:
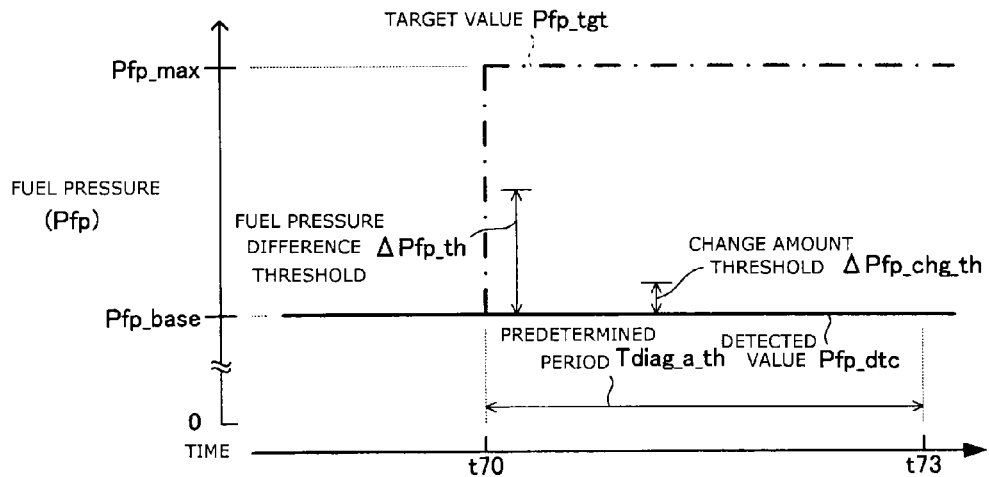
Figure 8:
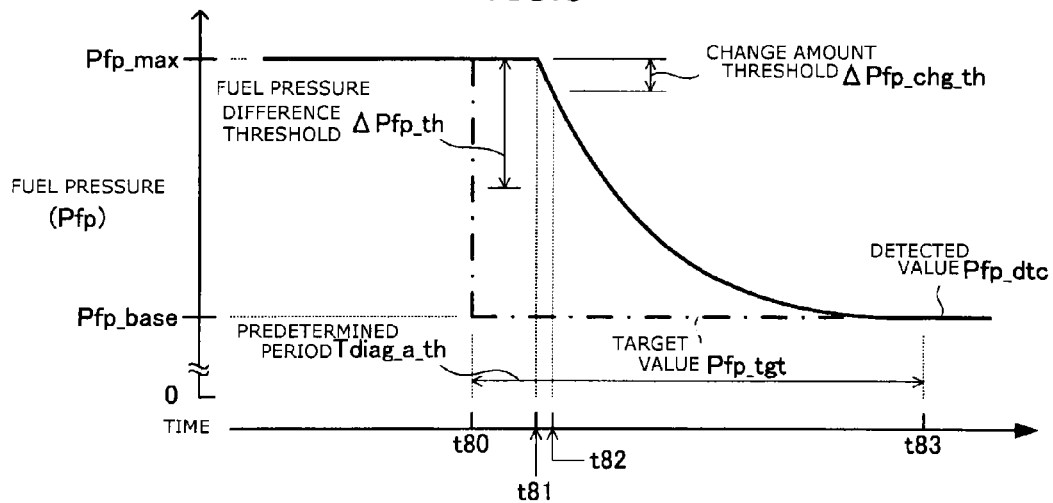
FIG. 8A is a time chart showing the change in the detected value of a fuel pressure sensor when the fuel pressure sensor is normal.
FIG. 8B is a time chart showing the change in the detected value of the fuel pressure sensor when the fuel pressure sensor is abnormal.
Figure 8:
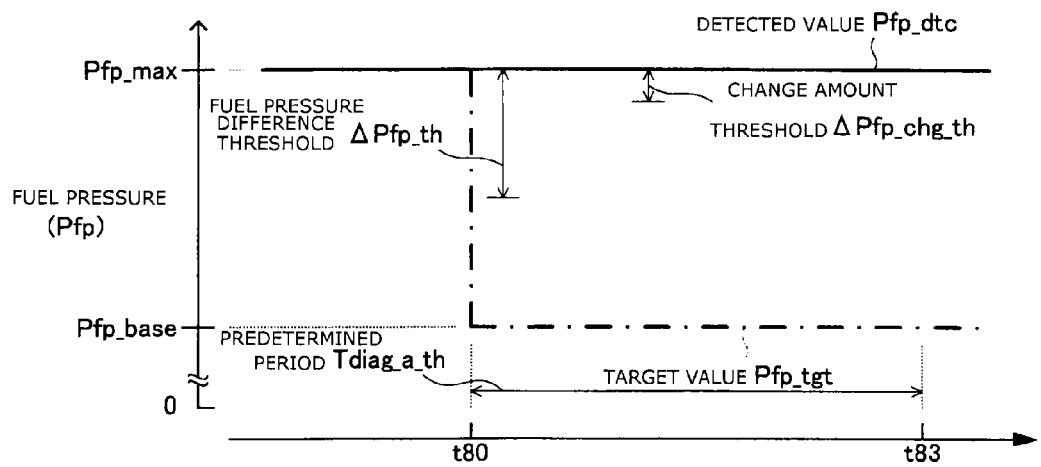
Figure 9:
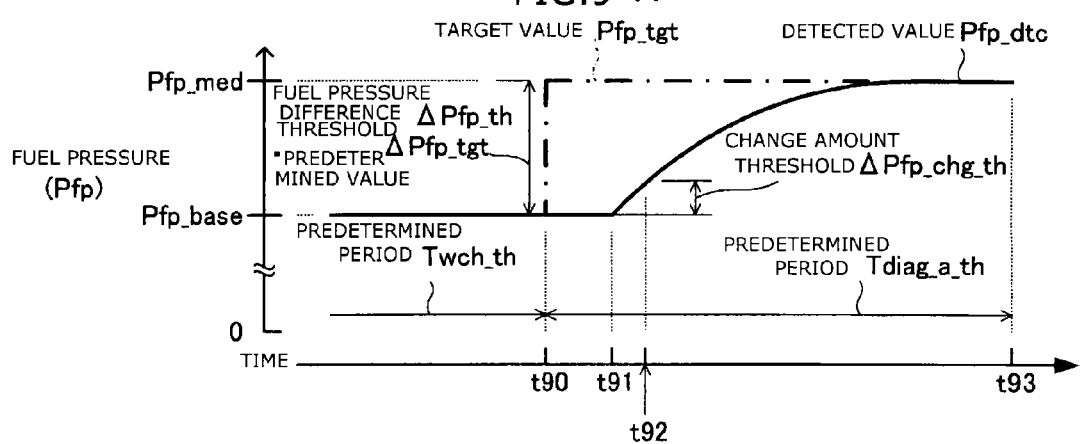
FIG. 9A is a time chart showing the change in the detected value of a fuel pressure sensor when the fuel pressure sensor is normal.
FIG. 9B is a time chart showing the change in the detected value of the fuel pressure sensor when the fuel pressure sensor is abnormal.
Figure 9:
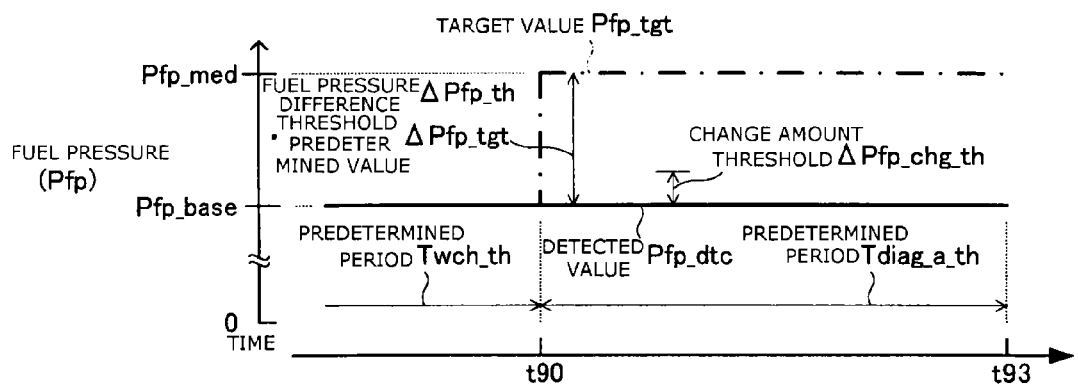
Figure 10:
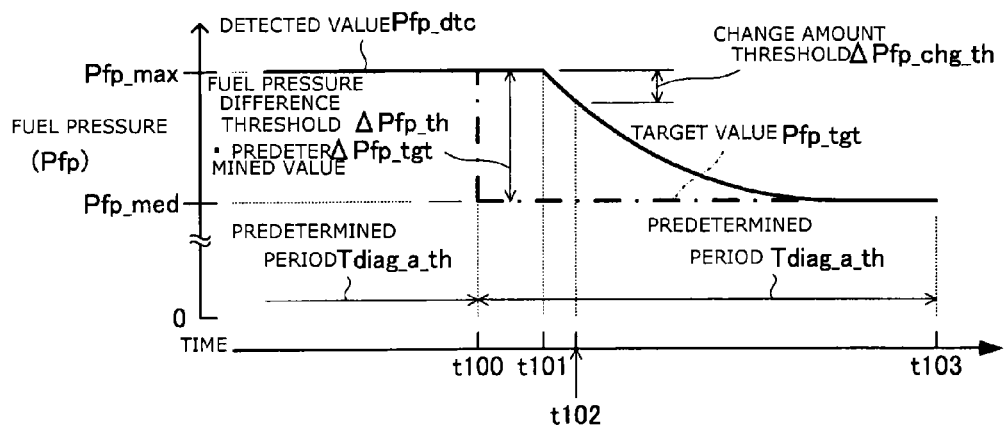
FIG. 10A is a time chart showing the change in the detected value of a fuel pressure sensor when the fuel pressure sensor is normal.
FIG. 10B is a time chart showing the change in the detected value of the fuel pressure sensor when the fuel pressure sensor is abnormal.
Figure 10:
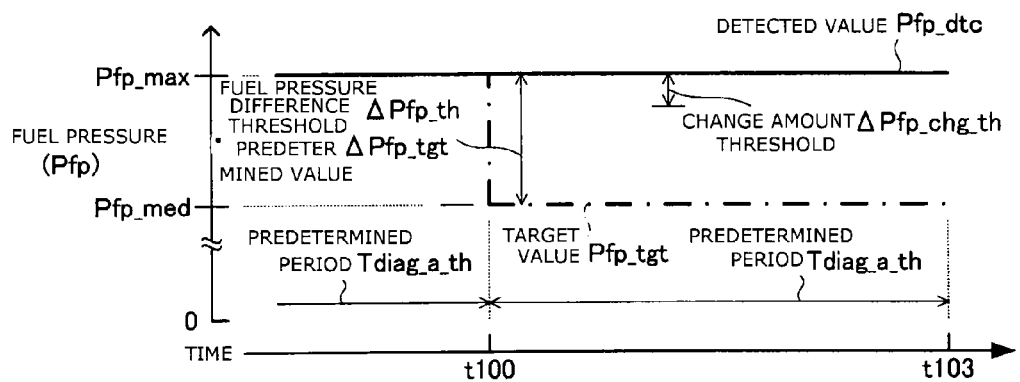
Figure 11:
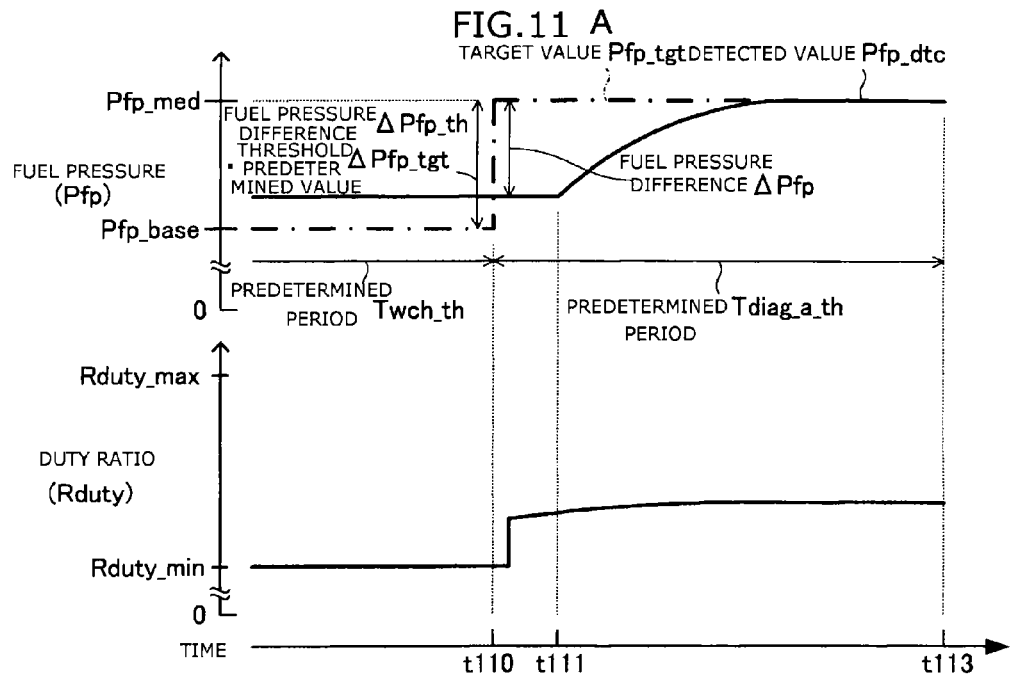
FIG. 11A and FIG. 11B are a time chart showing changes in the detected value and a duty ratio of the fuel pressure sensor when the fuel pressure sensor is normal.
Figure 11:
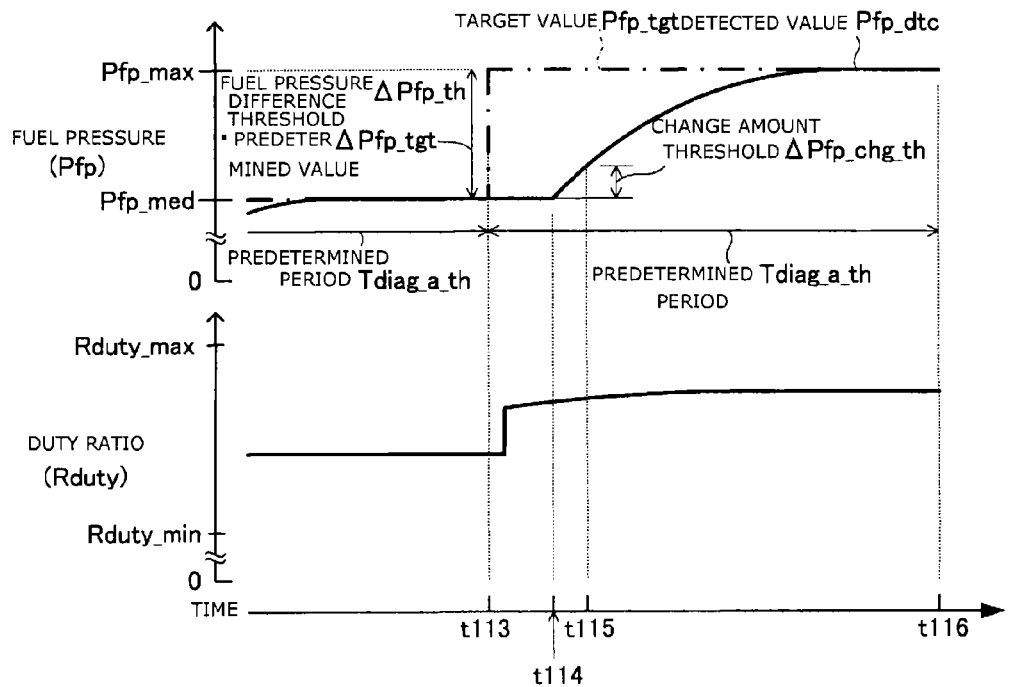
Figure 12:
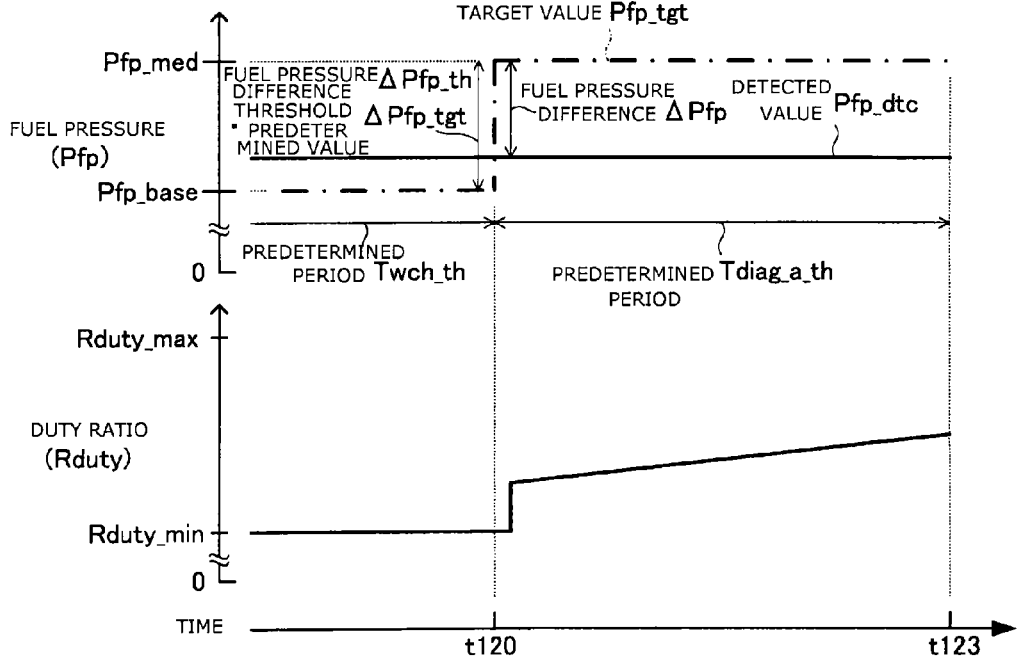
FIG. 12A and FIG. 12B are a time chart showing the changes in the detected value and the duty ratio of the fuel pressure sensor when the fuel pressure sensor is abnormal.
Figure 12:
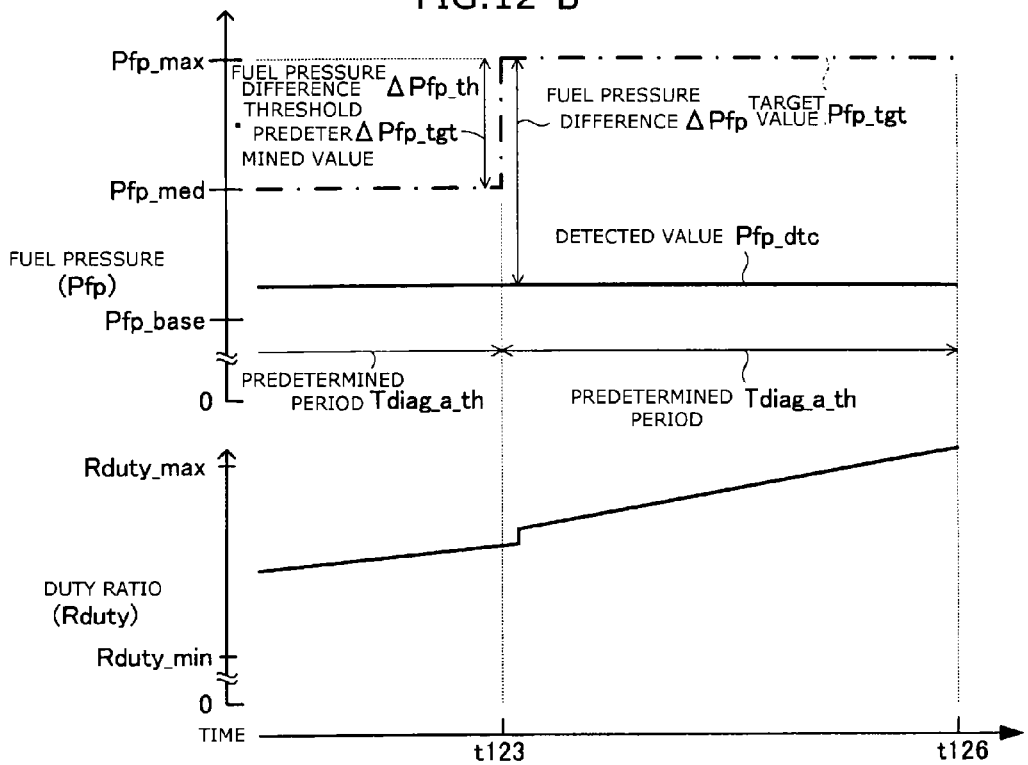

Specifically, the CPU is adapted to execute the active control continuation flag setting routine shown by the flowchart in FIG. 6 at a predetermined interval.

Therefore, the CPU starts the routine from step 600 of FIG. 6 at a predetermined timing and proceeds to step 605, in which it determines whether the active control is being executed. If the active control is being executed, the CPU determines "Yes" in this step 605 and proceeds to step 610, in which it determines whether the feedback control flag Xfb has a value of "0".

When the CPU executes step 610, if the feedback control flag Xfb has a value of "0", the CPU determines "Yes" in this step 610 and executes step 615 which will be described later. Then, the CPU proceeds to step 695 and ends the routine temporarily.

Step 615: the CPU inputs "1" to the active control continuation flag Xcnt.

In contrast, when the CPU executes step 610, if the feedback control flag Xfb has a value of "1", the CPU determines "No" in this step 610 and executes step 620 which will be described later. Then, the CPU proceeds to step 695 and ends the routine temporarily.

Step 620: the CPU inputs "0" to the active control continuation flag Xcnt.

On the other hand, when the CPU executes step 605, if the active control is not being executed, the CPU determines "No" in this step 605 and executes step 620 which will be described later. Then, the CPU proceeds to step 695 and ends the routine.

Accordingly, even if the feedback control flag Xfb has a value of "0" by the active control, it is determined "Yes" in Step 320 of FIG. 3. Therefore, even if the fuel pressure feedback control is stopped by the active control, the execution of the active control is prevented from being prohibited. Therefore, it is possible to make more abnormality diagnosis of the low pressure side fuel pressure sensor 71p.

<Outline of Operation of First Abnormality Diagnosis of Diagnosis Apparatus>

Next, an outline of the operation of the abnormality diagnosis of the low pressure side fuel pressure sensor 71p (first abnormality diagnosis) of the diagnosis apparatus will be described with reference to FIG. 7A to FIG. 12B. The diagnosis apparatus diagnoses whether a so-called sensor stack (anchoring) abnormality has occurred, that is, even if the actual pressure of the fuel Pfp_actual (hereinafter referred to as "actual fuel pressure") in the low pressure delivery pipe 33p is changed as the diaphragm of the low pressure side fuel pressure sensor 71p is not deformed, the detected value Pfp_dtc of the low pressure side fuel pressure sensor 71p does not change.

In the example shown in FIG. 7A and FIG. 7B, the maximum target value setting is not required before time t70, and the execution of the active control is also not required. Therefore, the reference value Pfp_base is set to the target value Pfp_tgt. Further, the detected value Pfp_dtc of the low pressure side fuel pressure sensor 71p coincides with the target value Pfp_tgt.

In this case, when the maximum target value setting is required at time t70, the maximum value Pfp_max is set to the target value Pfp_tgt. As a result, at time t70, the detected value Pfp_dtc is less than the target value Pfp_tgt. The difference ΔPfp between the detected value Pfp_dtc and the target value Pfp_tgt (=Pfp_tgt−Pfp_dtc) at this time is greater than the fuel pressure difference threshold ΔPfp_th. Thus, when the difference (fuel pressure difference) ΔPfp is the fuel pressure difference threshold ΔPfp_th or more, the diagnosis apparatus makes the abnormality diagnosis of the low pressure side fuel pressure sensor 71p.

Specifically, if the target value Pfp_tgt is increased to the maximum value Pfp_max at time t70, the fuel discharge amount of the low pressure pump 31p is increased by the fuel pressure feedback control as described above. As a result, the actual fuel pressure Pfp_actual is increased.

At this time, if the low pressure side fuel pressure sensor 71p is normal, the detected value Pfp_dtc starts to be increased toward the target value Pfp_tgt (see time t71 in FIG. 7A). Further, the detected value Pfp_dtc has been increased by the change amount threshold ΔPfp_chg_th until time t72. Therefore, the detected value Pfp_dtc is increased by at least the change amount threshold ΔPfp_chg_th or more from when the target value Pfp_tgt is increased until the predetermined period Tdiag_a_th has elapsed (a period from time t70 to time t73).

In this example, the predetermined period Tdiag_a_th is set to a sufficient but not excessive period from when the detected value Pfp_dtc is deviated greatly from the target value Pfp_tgt by the fuel pressure difference threshold ΔPfp_th or more, during which the detected value Pfp_dtc is changed (increased or decreased) by the change amount threshold ΔPfp_chg_th when the low pressure side fuel pressure sensor 71p is normal. On the other hand, the change amount threshold ΔPfp_chg_th is set to a value such that when the low pressure side fuel pressure sensor 71p is normal, the detected value Pfp_dtc is changed by a minimum amount from when the detected value Pfp_dtc is deviated greatly from the target value Pfp_tgt by the fuel pressure difference threshold ΔPfp_th or more until the predetermined period Tdiag_a_th has elapsed.

Thus, when the target value Pfp_tgt is greater than the detected value Pfp_dtc by the fuel pressure difference threshold ΔPfp_th or more, if the detected value Pfp_dtc is increased by the change amount threshold ΔPfp_chg_th or more from this time until the predetermined period Tdiag_a_th has elapsed, the diagnosis apparatus makes a provisional determination that the low pressure side fuel pressure sensor 71p is normal.

On the other hand, as shown in FIG. 7B, at time t70, even though the target value Pfp_tgt is greater than the detected value Pfp_dtc by the fuel pressure difference threshold ΔPfp_th or more, if the detected value Pfp_dtc is not increased by the change amount threshold ΔPfp_chg_th or more from this time until the predetermined period Tdiag_a_th has elapsed, the diagnosis apparatus makes a provisional determination that the low pressure side fuel pressure sensor 71p is abnormal.

Further, in the example shown in FIG. 8A and FIG. 8B, the maximum target value setting is required before time t80, the maximum value Pfp_max is set to the target value Pfp_tgt, and the detected value Pfp_dtc coincides with the target value Pfp_tgt.

In this case, if the maximum target value setting is not required at time t80, the reference value Pfp_base is set to the target value Pfp_tgt. As a result, at time t80, the detected value Pfp_dtc is greater than the target value Pfp_tgt. The difference ΔPfp between the detected value Pfp_dtc and the target value Pfp_tgt (=Pfp_tgt−Pfp_dtc) at this time is greater than the fuel pressure difference threshold ΔPfp_th. Thus, when the difference ΔPfp is the fuel pressure difference threshold ΔPfp_th or more, the diagnosis apparatus makes the abnormality diagnosis of the low pressure side fuel pressure sensor 71p.

Specifically, if the target value Pfp_tgt is decreased to the reference value Pfp_base at time t80, the fuel discharge amount of the low pressure pump 31p is decreased by the fuel pressure feedback control as described above. As a result, the actual fuel pressure Pfp_actual is decreased.

At this time, if the low pressure side fuel pressure sensor 71p is normal, the detected value Pfp_dtc starts to be decreased toward the target value Pfp_tgt (see time t81 in FIG. 8A). Further, the detected value Pfp_dtc has been decreased by the change amount threshold ΔPfp_chg_th until time t82. Therefore, the detected value Pfp_dtc is decreased by at least the change amount threshold ΔPfp_chg_th or more from when the target value Pfp_tgt is decreased until the predetermined period Tdiag_a_th has elapsed (a period from time t80 to time t83).

Thus, when the target value Pfp_tgt is less than the detected value Pfp_dtc by the fuel pressure difference threshold ΔPfp_th or more, if the detected value Pfp_dtc is decreased by the change amount threshold ΔPfp_chg_th or more from this time until the predetermined period Tdiag_a_th has elapsed, the diagnosis apparatus makes a provisional determination that the low pressure side fuel pressure sensor 71p is normal.

On the other hand, as shown in FIG. 8B, at time t80, even though the target value Pfp_tgt is less than the detected value Pfp_dtc by the fuel pressure difference threshold ΔPfp_th or more, if the detected value Pfp_dtc is not decreased by the change amount threshold ΔPfp_chg_th or more from this time until the predetermined period Tdiag_a_th has elapsed, the diagnosis apparatus makes a provisional determination that the low pressure side fuel pressure sensor 71p is abnormal.

In addition, as described with reference to FIG. 3, if the target value Pfp_tgt has a value of the reference value Pfp_base and a state where the target value Pfp_tgt is greater than or less than the detected value Pfp_dtc by the fuel pressure difference threshold ΔPfp_th or more (derivation state) does not occur during a predetermined period Twch_th (a period corresponding to the predetermined value Cwch_th in FIG. 3), the ECU 70 starts the active control.

FIG. 9A and FIG. 9B show the fuel pressure sensor abnormality diagnosis that is made by the diagnosis apparatus when the target value Pfp_tgt has a value of the reference value Pfp_base and a state where the target value Pfp_tgt is greater than or less than the detected value Pfp_dtc by the fuel pressure difference threshold ΔPfp_th or more does not occur during the predetermined period Twch_th.

In the example shown in FIG. 9A and FIG. 9B, at time t90 after the predetermined period Twch_th has elapsed, the active control as described above is started. As a result, the target value Pfp_tgt is increased by the predetermined value ΔPfp_tgt from the reference value Pfp_base.

As a result, at time t90, the target value Pfp_tgt is greater than the detected value Pfp_dtc by the fuel pressure difference threshold ΔPfp_th. Therefore, at this time, the diagnosis apparatus makes the abnormality diagnosis of the low pressure side fuel pressure sensor 71p.

Specifically, if the target value Pfp_tgt is increased at time t90, the fuel discharge amount of the low pressure pump 31p is increased by the fuel pressure feedback control as described above. As a result, the actual fuel pressure Pfp_actual is increased.

At this time, if the low pressure side fuel pressure sensor 71p is normal, the detected value Pfp_dtc starts to be increased toward the target value Pfp_tgt (see time t91 in FIG. 9A). Further, the detected value Pfp_dtc has been increased by the change amount threshold ΔPfp_chg_th until time t72. Therefore, the detected value Pfp_dtc is increased by at least the change amount threshold ΔPfp_chg_th or more from when the target value Pfp_tgt is increased until the predetermined period Tdiag_a_th has elapsed (a period from time t90 to time t93).

Thus, when the target value Pfp_tgt is greater than the detected value Pfp_dtc by the fuel pressure difference threshold ΔPfp_th or more, if the detected value Pfp_dtc is increased by the change amount threshold ΔPfp_chg_th or more from this time until the predetermined period Tdiag_a_th has elapsed, the diagnosis apparatus makes a provisional determination that the low pressure side fuel pressure sensor 71p is normal.

On the other hand, as shown in FIG. 9B, at time t90, even though the target value Pfp_tgt is greater than the detected value Pfp_dtc by the fuel pressure difference threshold ΔPfp_th, if the detected value Pfp_dtc is not increased by the change amount threshold ΔPfp_chg_th or more from this time until the predetermined period Tdiag_a_th has elapsed, the diagnosis apparatus makes a provisional determination that the low pressure side fuel pressure sensor 71p is abnormal.

Further, according to the active control as described above, at time t93 after the predetermined period Tdiag_a_th has elapsed from time t90, the target value Pfp_tgt is further increased by the fuel pressure difference threshold ΔPfp_th (in this example, the target value Pfp_tgt is increased to the maximum value Pfp_max from the intermediate value Pfp_med). At this time, if the detected value Pfp_dtc is increased by the change amount threshold ΔPfp_chg_th or more from when the target value Pfp_tgt is increased until the predetermined time period Tdiag_a_th has elapsed, the diagnosis apparatus makes a provisional determination that the low pressure side fuel pressure sensor 71p is normal. On the other hand, even though the target value Pfp_tgt is increased by the fuel pressure difference threshold ΔPfp_th or more, if the detected value Pfp_dtc is not increased by the change amount threshold ΔPfp_chg_th or more from when the target value Pfp_tgt is increased until the predetermined time period Tdiag_a_th has elapsed, the diagnosis apparatus makes a provisional determination that the low pressure side fuel pressure sensor 71p is abnormal.

Further, according to the active control as described above, at time (see time t100 in FIG. 10A and FIG. 10B) after the predetermined period Tdiag_a_th has elapsed since the target value Pfp_tgt is increased to the maximum value Pfp_max (see time t93 in FIG. 9B), the target value Pfp_tgt is decreased by the predetermined value ΔPfp_tgt (in this example, the target value Pfp_tgt is decreased from the maximum value Pfp_max to the intermediate value Pfp_med).

As a result, at time t100, the target value Pfp_tgt is less than the detected value Pfp_dtc by the fuel pressure difference threshold ΔPfp_th. At this time, the diagnosis apparatus executes the abnormality diagnosis of the low pressure side fuel pressure sensor 71p.

Specifically, if the target value Pfp_tgt is decreased at time t100, the fuel discharge amount of the low pressure pump 31p is decreased by the fuel pressure feedback control as described above. As a result, the actual fuel pressure Pfp_actual is decreased.

At this time, if the low pressure side fuel pressure sensor 71p is normal, the detected value Pfp_dtc that coincides with the target value Pfp_tgt before it is decreased starts to be decreased to the target value Pfp_tgt after it is decreased (see time t101 in FIG. 10A). In addition, the detected value Pfp_dtc is decreased by the change amount threshold ΔPfp_chg_th until time t102. Therefore, the detected value Pfp_dtc is decreased by at least the change amount threshold ΔPfp_chg_th or more from when the target value Pfp_tgt is decreased until the predetermined period Tdiag_a_th has elapsed (a period from time t100 until time t103).

Thus, when the target value Pfp_tgt is less than the detected value Pfp_dtc by the fuel pressure difference threshold ΔPfp_th or more, if the detected value Pfp_dtc is decreased by the change amount threshold ΔPfp_chg_th or more from this time until the predetermined period Tdiag_a_th has elapsed, the diagnosis apparatus makes a provisional determination that the low pressure side fuel pressure sensor 71p is normal.

On the other hand, as shown in FIG. 10B, at time t100, even though the target value Pfp_tgt is less than the detected value Pfp_dtc by the fuel pressure difference threshold ΔPfp_th, if the detected value Pfp_dtc that coincides with the target value Pfp_tgt before it is decreased is not decreased by the change amount threshold ΔPfp_chg_th or more from this time until the predetermined period Tdiag_a_th has elapsed, the diagnosis apparatus makes a provisional determination that the low pressure side fuel pressure sensor 71p is abnormal.

Thus, the diagnosis apparatus repeats the provisional determination that the low pressure side fuel pressure sensor 71p is normal and the provisional determination that the low pressure side fuel pressure sensor 71p is abnormal in the active control.

Further, if the diagnosis apparatus makes the normal determination as described above a predetermined number of times, it makes a formal determination that the low pressure side fuel pressure sensor 71p is normal. On the other hand, if the diagnosis apparatus makes the abnormal determination as described above the predetermined number of times, it makes a formal determination that the low pressure side fuel pressure sensor 71p is abnormal. In this example, the predetermined number is a number greater than "1", and is set to a sufficient but not excessive number for determining that the low pressure side fuel pressure sensor 71p is normal or abnormal.

Thus, the diagnosis apparatus diagnoses whether the low pressure side fuel pressure sensor 71p is abnormal in the active control.

Incidentally, the example described with reference to FIG. 9A to FIG. 10B is an example in which the detected value Pfp_dtc coincides with the target value Pfp_tgt and the abnormality diagnosis of the low pressure side fuel pressure sensor 71p is started from when the feedback amount ΔFB has not reached the lower limit value ΔFB_lower thereof.

However, in the present embodiment, since the state where the detected value Pfp_dtc is greater than the target value Pfp_tgt is continued, even when the feedback amount ΔFB reaches the lower limit value ΔFB_lower thereof, the abnormality diagnosis of the low pressure side fuel pressure sensor 71p is made.

Next, the abnormality diagnosis will be described with reference to FIG. 11A to FIG. 12B.

In the example shown in FIG. 11A and FIG. 11B, before time t110, since the state where the detected value Pfp_dtc is greater than the target value Pfp_tgt is continued, the feedback amount ΔFB becomes the lower limit value ΔFB_lower thereof, and the duty ratio Rduty becomes a duty ratio Rduty_min that is less than the base duty ratio Rduty_base (hereinafter referred to as "minimum duty ratio"). In addition, in this example, since the state where the target value Pfp_tgt is greater than or less than the detected value Pfp_dtc by the fuel pressure difference threshold ΔPfp_th does not occur during the predetermined period Twch_th, the active control is started at time t110.

Similarly, in the example shown in FIG. 12A and FIG. 12B, before time t120, since the state where the detected value Pfp_dtc is greater than the target value Pfp_tgt is continued, the feedback amount ΔFB becomes the lower limit value ΔFB_lower thereof, and the duty ratio Rduty becomes the minimum duty ratio Rduty_min. In addition, in this example, since the state where the target value Pfp_tgt is greater than or less than the detected value Pfp_dtc by the fuel pressure difference threshold ΔPfp_th does not occur during the predetermined period Twch_th, the active control is started at time t120.

If the active control is started, as shown in FIG. 11A and FIG. 12A, the target value Pfp_tgt is increased by the predetermined value ΔPfp_tgt (in this example, the target value Pfp_tgt is increased from the reference value Pfp_base to the intermediate value Pfp_med). At this time, since the target value Pfp_tgt is not greater than the detected value Pfp_dtc by the fuel pressure difference threshold ΔPfp_th, the abnormality diagnosis of the low pressure side fuel pressure sensor 71p is not made, and the fuel pressure feedback control as described above is executed. Therefore, the duty ratio Rduty is increased, and as a result, the actual fuel pressure Pfp_actual is increased.

At this time, if the low pressure side fuel pressure sensor 71p is normal, as shown in FIG. 11A, before the predetermined period Tdiag_a_th elapses, the detected value Pfp_dtc shall coincide with the target value Pfp_tgt. On the other hand, if the low pressure side fuel pressure sensor 71p is abnormal, as shown in FIG. 12A, there is no change during the predetermined period Tdiag_a_th, and at time t123 after the predetermined period Tdiag_a_th has elapsed, the detected value Pfp_dtc is less than the target value Pfp_tgt.

Further, as shown in FIG. 11B, at time t113 after the predetermined period Tdiag_a_th has elapsed from time t110, the target value Pfp_tgt is further increased by the predetermined value ΔPfp_tgt (in this example, the target value Pfp_tgt is increased from the intermediate value Pfp_med to the maximum value Pfp_max). At this time, the target value Pfp_tgt is greater than the detected value Pfp_dtc by the fuel pressure difference threshold ΔPfp_th.

At this time, the diagnosis apparatus makes the abnormality diagnosis of the low pressure side fuel pressure sensor 71p as described above. In other words, in the example shown in FIG. 11B, since the low pressure side fuel pressure sensor 71p is normal, the detected value Pfp_dtc is increased by the change amount threshold ΔPfp_chg_th or more during a period from time t113 to time t116 after the predetermined period Tdiag_a_th has elapsed. Therefore, in this case, the diagnosis apparatus makes a provisional determination that the low pressure side fuel pressure sensor 71p is normal.

On the other hand, if the low pressure side fuel pressure sensor 71p is abnormal, as shown in FIG. 12B, at time t123, even if the target value Pfp_tgt is further increased by the predetermined value ΔPfp_tgt, the detected value Pfp_dtc is not increased by the change amount threshold ΔPfp_chg_th or more during a period from time t123 to time t126 after the predetermined period Tdiag_a_th has elapsed. Therefore, in this case, the diagnosis apparatus makes a provisional determination that the low pressure side fuel pressure sensor 71p is abnormal.

As a result of making such provisional determination, if the diagnosis apparatus makes the normal determination as described above a predetermined number of times, it makes a formal determination that the low pressure side fuel pressure sensor 71p is normal. On the other hand, if the diagnosis apparatus makes the abnormal determination as described above the predetermined number of times, it makes a formal determination that the low pressure side fuel pressure sensor 71p is abnormal. In this example, the predetermined number is also set to a sufficient but not excessive number for determining that the low pressure side fuel pressure sensor 71p is normal or abnormal.

The above is the outline of the operation of the first abnormality diagnosis of the low pressure side fuel pressure sensor 71p of the diagnosis apparatus.

<Specific Operation of First Abnormality Diagnosis of Diagnosis Apparatus>

Next, the specific operation of the first abnormality diagnosis of the low pressure side fuel pressure sensor 71p of the diagnosis apparatus will be described. The CPU is adapted to execute an abnormality diagnosis routine shown by the flowchart in FIG. 13 at a predetermined interval. Therefore, the CPU starts the routine from step 1300 of FIG. 13 at a predetermined timing and proceeds to step 1302, in which it determines whether a diagnosis execution flag Xdiag that is set by the routine shown in FIG. 14 which will be described later has a value of "1".

When the CPU executes step 1302, if the diagnosis execution flag Xdiag has a value of "0", the CPU determines "No" in this step 1302 and sequentially executes step 1336 to step 1342 which will be described later. Then, the CPU proceeds to step 1395 and ends the routine temporarily.

Step 1336: the CPU clears an abnormality diagnosis time counter Cdiag_a which will be described later. Step 1338: the CPU clears a normal number of times counter Cn which will be described later. Step 1340: the CPU clears an abnormal number of times counter Cm_a which will be described later. Step 1342: the CPU inputs "0" to a first time flag Xfirst which will be described later.

In contrast, when the CPU executes step 1302, if the diagnosis execution flag Xdiag has a value of "1", the CPU determines "Yes" in this step 1302 and proceeds to step 1304, in which it determines whether the first time flag Xfirst has a value of "0". If the first time flag Xfirst has a value of "0", the CPU determines "Yes" in this step 1304 and sequentially executes step 1306 to step 1310 which will be described later. Then, the CPU proceeds to step 1312.

Step 1306: the CPU inputs "1" to the first time flag Xfirst. Step 1308: the CPU obtains the detected value Pfp_dtc at this time as a reference detected value Pfp_dtc_base. Then the reference detected value Pfp_dtc_base is used to calculate the change amount of the detected value Pfp_dtc. Step 1310: the CPU counts up the abnormality diagnosis time counter Cdiag_a by a predetermined value ΔCdiag_a. The predetermined value ΔCdiag_a is a value corresponding to the time interval at which the routine is executed.

In contrast, when the CPU executes step 1304, if the first time flag Xfirst has a value of "1", the CPU determines "No" in this step 1304 and executes step 1310 as described above. Then, the CPU proceeds to step 1312.

After the CPU proceeds to step 1312, it determines whether the abnormality diagnosis time counter Cdiag_a has a predetermined value Cdiag_a_th or more. The predetermined value Cdiag_a_th is a value corresponding to the predetermined period Tdiag_a_th as described above.

When the CPU executes step 1312, if the abnormality diagnosis time counter Cdiag_a has a value less than the predetermined value Cdiag_a_th, the CPU determines "No" in this step 1312, proceeds to step 1395 and ends the routine temporarily. In contrast, if the abnormality diagnosis time counter Cdiag_a has the predetermined value Cdiag_a_th or more, the CPU determines "Yes" in this step 1312 and executes step 1314 which will be described later. Then, the CPU proceeds to step 1316.

Step 1314: the CPU obtains the change amount ΔPfp_chg of the detected value Pfp_dtc from the reference detected value Pfp_dtc_base (ΔPfp_chg=|Pfp_dtc−Pfp_base|).

After the CPU proceeds to step 1316, it determines whether the change amount ΔPfp_chg is above the change amount threshold ΔPfp_chg_th. If the change amount ΔPfp_chg is above the change amount threshold ΔPfp_chg_th, the CPU determines "Yes" in this step 1316 and sequentially executes step 1318, step 1320 and step 1322 which will be described later. Then, the CPU proceeds to step 1324.

If the contrary, when the CPU executes step 1316, if the change amount ΔPfp_chg is less than the change amount threshold ΔPfp_chg_th, the CPU determines "No" in this step 1316 and sequentially executes step 1330, step 1320 and step 1322 which will be described later. Then, the CPU proceeds to step 1324.

Step 1318: the CPU counts up the normal number of times counter Cn. The normal number of times counter Cn indicates the number of times of making the provisional determination that the low pressure side fuel pressure sensor 71p is normal. Step 1330: the CPU counts up the abnormal number of times counter Cm_a. The abnormal number of times counter Cm_a indicates the number of times of making the provisional determination that the low pressure side fuel pressure sensor 71p is abnormal. Step 1320: the CPU clears the abnormality diagnosis time counter Cdiag_a. Step 1322: the CPU inputs "0" to the first time flag Xfirst.

After the CPU proceeds to step 1324, it determines whether the normal number of times counter Cn has a predetermined value Cn_th or more. In this example, the predetermined value Cn_th is a value corresponding to the predetermined number of times as described above.

When the CPU executes step 1324, if the normal number of times counter Cn has the predetermined value Cn_th or more, the CPU determines "Yes" in this step 1324 and sequentially executes step 1326 and step 1328 which will be described later. Then, the CPU proceeds to step 1395 and ends the routine temporarily.

Step 1326: the CPU makes a formal determination that the low pressure side fuel pressure sensor 71p is normal, and stores this fact in the backup RAM. Step 1328: the CPU inputs "0" to the active control flag Xact.

In contrast, when the CPU executes step 1324, if the normal number of times counter Cn has a value less than the predetermined value Cn_th, the CPU determines "No" in this step 1324 and proceeds to step 1332, in which it determines whether the abnormal number of times counter Cm_a has a predetermined value Cm_th or more. In this example, the predetermined value Cm_th is a value corresponding to the predetermined number of times as described above.

When the CPU executes step 1332, if the abnormal number of times counter Cm_a has a value less than the predetermined value Cm_th, the CPU determines "No" in this step 1324, proceeds to step 1395 and ends the routine temporarily. In contrast, if the abnormal number of times counter Cm_a has the predetermined value Cm_th or more, the CPU determines "Yes" in this step 1332 and sequentially executes step 1328 which will be described later and step 1334 as described above. Then, the CPU proceeds to step 1395 and ends the routine temporarily.

Step 1334: the CPU makes a formal determination that the low pressure side fuel pressure sensor 71p is abnormal, and stores this fact in the backup RAM.

Then, setting of the diagnosis execution flag Xdiag that is mentioned in the explanation of step 1302 in FIG. 13 will be described. The CPU is adapted to execute a diagnosis execution flag setting routine shown by the flowchart in FIG. 14 at a predetermined interval. Therefore, the CPU starts the routine from step 1400 of FIG. 14 at a predetermined timing and proceeds to step 1405, in which it determines whether a condition for making the abnormality diagnosis of the low pressure side fuel pressure sensor 71p (abnormality diagnosis condition) is satisfied. The condition is satisfied in the case where the abnormality of the low pressure side fuel pressure sensor 71p (for example, an abnormality caused by disconnection in the low pressure side fuel pressure sensor 71p or the like) other than the so-called sensor stack abnormality as described above does not occur.

If the diagnosis condition is satisfied, the CPU determines "Yes" in this step 1405 and executes the step 1410 which will be described later. Then, the CPU proceeds to step 1415.

Step 1410: the CPU obtains a difference (fuel pressure difference) ΔPfp between the detected value Pfp_dtc and the target value Pfp_tgt (ΔPfp=|Pfp_tgt−Pfp_dtc|).

After the CPU proceeds to step 1415, it determines whether the fuel pressure difference ΔPfp is above the fuel pressure difference threshold ΔPfp_th. When the fuel pressure difference ΔPfp is above the fuel pressure difference threshold ΔPfp_th, the CPU determines "Yes" in this step 1415 and executes step 1420 which will be described later. Then, the CPU proceeds to step 1495 and ends the routine temporarily.

In contrast, when the CPU executes step 1415, if the Pfp is less than the fuel pressure difference threshold ΔPfp_th, the CPU determines "No" in this step 1415 and executes step 1425 which will be described later. Then, the CPU proceeds to step 1495 and ends the routine temporarily.

Step 1420: the CPU inputs "1" to the diagnosis execution flag Xdiag. Step 1425: the CPU inputs "0" to the diagnosis execution flag Xdiag.

The above is the setting of the diagnosis execution flag Xdiag.

<Outline of Operation of Second Abnormality Diagnosis of Diagnosis Apparatus>

In addition, since the state where the detected value Pfp_dtc is less than the target value Pfp_tgt is continued, when the duty ratio Rduty becomes the maximum duty ratio Rduty_max, the diagnosis apparatus makes the abnormality diagnosis of the low pressure side fuel pressure sensor 71p in a manner as described below.

Figure 15:
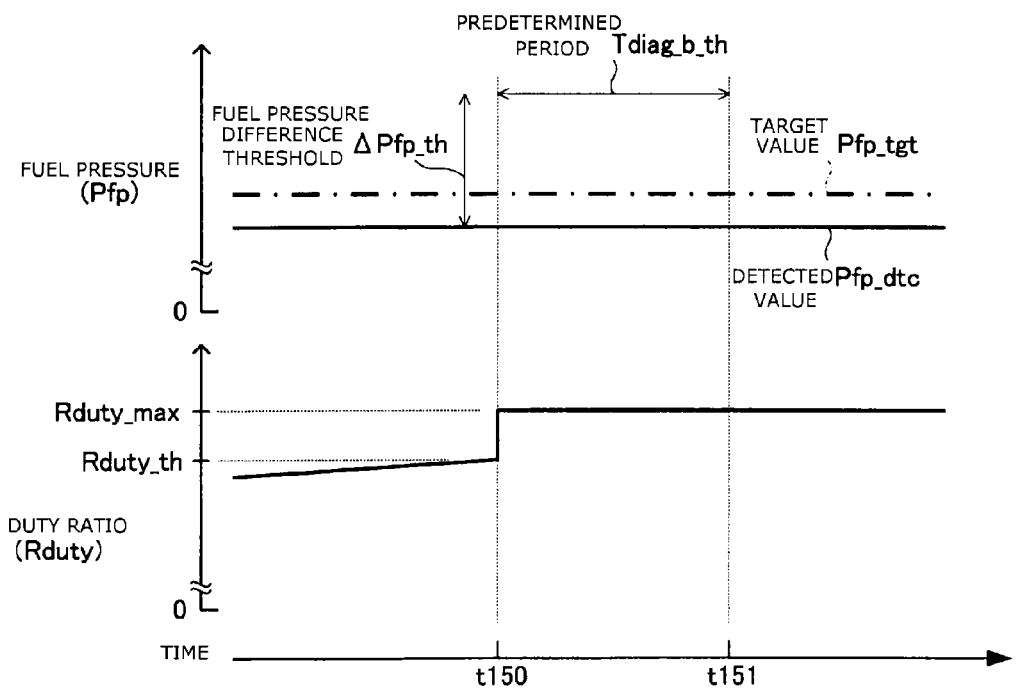
FIG. 15 is a time chart showing the changes in the detected value and the duty ratio of the fuel pressure sensor when the fuel pressure sensor is abnormal.

FIG. 15 is a time chart showing changes in the detected value Pfp_dtc and the duty ratio Rduty when the state where the detected value Pfp_dtc is less than the target value Pfp_tgt is continued. If the detected value Pfp_dtc is less than the target value Pfp_tgt, the duty ratio Rduty is increased by the fuel pressure feedback control as described above, and then is set to the maximum duty ratio Rduty_max at the time when it exceeds the predetermined value Rduty_th (see time t150).

In the example shown in FIG. 15, although the duty ratio Rduty is set to the maximum duty ratio Rduty_max and the fuel discharge amount of the low pressure pump 31p has reached its maximum amount, the detected value Pfp_dtc is less than the target value Pfp_tgt. Thus, although the fuel discharge amount of the low pressure pump 31p has reached its maximum amount, a phenomenon that the detected value Pfp_dtc does not reach the target value Pfp_tgt may occur in the case where a sensor stack abnormality occurs in the low pressure side fuel pressure sensor 71p, and the low pressure side fuel pressure sensor 71p only outputs the detected value Pfp_dtc corresponding to the fuel pressure that is less than the reference value Pfp_base due to such abnormality.

Therefore, the diagnosis apparatus makes a provisional determination that the low pressure side fuel pressure sensor 71p is abnormal in the case where, after the predetermined period Tdiag_b_th (a period from time t150 to time t151) has elapsed since the duty ratio Rduty is set to the maximum duty ratio Rduty_max, the duty ratio Rduty is the maximum duty ratio Rduty_max and the detected value Pfp_dtc is less than the target value Pfp_tgt. In this example, the predetermined time period Tdiag_b_th is set to a sufficient but not excessive period from when the duty ratio Rduty is set to the maximum duty ratio Rduty_max, during which the state where the detected value Pfp_dtc is less than the target value Pfp_tgt is eliminated when the low pressure side fuel pressure sensor 71p is normal.

The provisional determination is repeated, and if the number of times of making the provisional determination that the low pressure side fuel pressure sensor 71p is abnormal reaches a predetermined number of times, the diagnosis apparatus makes a formal determination that the low pressure side fuel pressure sensor 71p is abnormal. In this example, the predetermined number is a number of "1" or more, and is set to a sufficient but not excessive number of times of making the provisional determination for determining that the low pressure side fuel pressure sensor 71p is abnormal by the second abnormality diagnosis.

The above is the outline of the operation of the second abnormality diagnosis of the low pressure side fuel pressure sensor 71p of the diagnosis apparatus.

<Specific Operation of Second Abnormality Diagnosis of Diagnosis Apparatus>

Next, the specific operation of the second abnormality diagnosis of the low pressure side fuel pressure sensor 71p of the diagnosis apparatus will be described. The CPU is adapted to execute an abnormality diagnosis routine shown by the flowchart in FIG. 16 at a predetermined interval. Therefore, the CPU starts the routine from step 1600 of FIG. 16 at a predetermined timing and proceeds to step 1605, in which it determines whether a fuel consumption amount Qa per unit time in the engine 10 is above a lower limit value Qa_small and below an upper limit value Qa_large that is greater than the lower limit value Qa_small.

In this example, a target amount Qa_tgt of fuel injected from the port injection valve 22p that is calculated based on the engine rotation speed NE and a load KL of the engine 10 is determined by a routine that is separately executed. The fuel consumption amount Qa corresponds to an amount that is obtained by dividing an integrated value of the target amount Qa_tgt by time.

Further, if the fuel consumption amount Qa is large, decrease of the actual pressure of the fuel (actual fuel pressure) Pfp_actual in the low pressure delivery pipe 33p due to the fuel injection from the port injection valve 22p is large. Therefore, in order to maintain the actual fuel pressure Pfp_actual to the target value Pfp_tgt, the duty ratio Rduty is increased. As a result, there is a possibility that the duty ratio Rduty is set to the maximum duty ratio Rduty_max.

In the abnormality diagnosis of the low pressure side fuel pressure sensor 71p which will be described later, as one of conditions for determining that the low pressure side fuel pressure sensor 71p is abnormal, a condition that the duty ratio Rduty is the maximum duty ratio Rduty_max is employed. Therefore, the reason that the duty ratio Rduty is the maximum duty ratio Rduty_max is not in that the low pressure side fuel pressure sensor 71p is abnormal, but in that when the decrease of the actual fuel pressure Pfp_actual due to the fuel injection is large, the condition that the duty ratio Rduty is the maximum duty ratio Rduty_max is satisfied, and it shall not determine that the low pressure side fuel pressure sensor 71p is abnormal. Therefore, in the routine shown in FIG. 16, it is determined whether the fuel consumption amount Qa is below the upper limit value Qa_large in step 1605.

Further, if the fuel consumption amount Qa is small, decrease of the actual fuel pressure Pfp_actual due to the fuel injection from the port injection valve 22p is small. Therefore, even if the fuel discharge amount of the low pressure pump 31p is decreased in order to decrease the actual fuel pressure Pfp_actual, a rate of decrease of the actual fuel pressure Pfp_actual is small. As a result, there is a possibility that the fuel pressure feedback control does not function effectively to the actual fuel pressure Pfp_actual. In this case, the actual fuel pressure Pfp_actual does not follow the target value Pfp_tgt initially, and as a result, even if the low pressure side fuel pressure sensor 71p is normal, there is a possibility that the detected value Pfp_dtc does not follow the target value Pfp_tgt.

In the abnormality diagnosis of the low pressure side fuel pressure sensor 71p which will be described later, as one of conditions for determining that the low pressure side fuel pressure sensor 71p is abnormal, a condition that the detected value Pfp_dtc is less than the target value Pfp_tgt is employed. Therefore, the reason that the detected value Pfp_dtc is less than the target value Pfp_tgt is not in that the low pressure side fuel pressure sensor 71p is abnormal, but in that when the fuel pressure feedback control does not function effectively to the actual fuel pressure Pfp_actual, the condition that the detected value Pfp_dtc is less than the target value Pfp_tgt is satisfied, and it shall not determine that the low pressure side fuel pressure sensor 71p is abnormal. Therefore, in the routine shown in FIG. 16, it is determined whether the fuel consumption amount Qa is above the lower limit value Qa_small in step 1605.

When the CPU executes step 1605, if the fuel consumption amount Qa is above the lower limit value Qa_small and below the upper limit value Qa_large, the CPU determines "Yes" in this step 1605 and proceeds to step 1610, in which it determines whether the duty ratio is Rduty is the maximum duty ratio Rduty_max and the detected values Pfp_dtc is less than the target value Pfp_tgt.

If the duty ratio is Rduty is the maximum duty ratio Rduty_max and the detected values Pfp_dtc is less than the target value Pfp_tgt, the CPU determines "Yes" in this step 1610 and executes step 1615 which will be described later. Then, the CPU proceeds to step 1620.

Step 1615: an abnormality diagnosis time counter Cdiag_b is counts up by a predetermined value ΔCdiag_b. The predetermined value ΔCdiag_b is a value corresponding to the time interval at which the routine is executed.

After the CPU proceeds to step 1620, it determines whether the abnormality diagnosis time counter Cdiag_b has a predetermined value Cdiag_b_th or more. The predetermined value Cdiag_b_th is a value corresponding to the predetermined period Tdiag_b_th as described above.

When the CPU executes step 1620, if the abnormality diagnosis time counter Cdiag_b has the predetermined value Cdiag_b_th or more, the CPU determines "Yes" in this step 1620 and sequentially executes step 1625 and step 1630 which will be described later. Then, the CPU proceeds to step 1635.

Step 1625: the CPU counts up an abnormal number of times counter Cm_b. The abnormal number of times counter Cm_b indicates the number of times of making the provisional determination that the low pressure side fuel pressure sensor 71p is abnormal. Step 1630: the CPU clears the abnormality diagnosis time counter Cdiag_b.

After the CPU proceeds to step 1635, it determines whether the abnormal number of times counter Cm_b has a predetermined value Cm_th or more. The predetermined value Cm_th is a value corresponding to the predetermined number of times as described above.

When the CPU executes step 1635, if the abnormal number of times counter Cm_b has the predetermined value Cm_th or more, the CPU executes step 1640 which will be described later. Then, the CPU proceeds to step 1695 and ends the routine temporarily.

Step 1640: the CPU makes a formal determination that the low pressure side fuel pressure sensor 71p is abnormal, and stores this fact in the backup RAM.

In contrast, when the CPU executes step 1635, if the abnormal number of times counter Cm_b is less than the predetermined value Cm_th, the CPU determines "No" in this step 1635, proceeds to step 1695 and ends the routine temporarily.

On the other hand, when the CPU executes step 1605, if the fuel consumption amount Qa is less than the lower limit value Qa_small or greater than the upper limit value Qa_large, the CPU determines "No" in this step 1605 and sequentially executes step 1645 and step 1650 which will be described later. Then, the CPU proceeds to step 1695 and ends the routine temporarily.

Step 1645: the CPU clears the abnormality diagnosis time counter Cdiag_b. Step 1650: the CPU clears the abnormal number of times counter Cm_b.

Further, when the CPU executes step 1610, if the duty ratio Rduty is less than the maximum duty ratio Rduty_max or the detected value Pfp_dtc is above the target value Pfp_tgt, the CPU, the CPU determines "No" in this step 1610 and sequentially executes step 1645 and step 1650 as described above. Then, CPU, the process proceeds to step 1695 and terminates the routine temporarily.

In addition, when the CPU executes step 1620, if the abnormality diagnosis time counter Cdiag_b has a value less than the predetermined value Cdiag_b_th, the CPU determines "No" in this step 1620, proceeds to step 1695 and terminates the routine temporarily.

The above is the specific operation of the second abnormality diagnosis of the low pressure side fuel pressure sensor 71p of the diagnosis apparatus.

In addition, the diagnosis apparatus is applicable to abnormality diagnosis of the high pressure side fuel pressure sensor 71c that is disposed in the high pressure delivery pipe 33c. Further, the diagnosis apparatus is applicable to abnormality diagnosis of the low pressure side fuel pressure sensor 71p for a gasoline engine that does not have the in-cylinder injection valve 22c and only has the port injection valve 22p and abnormality diagnosis of the fuel pressure sensor 71c for a gasoline engine that does not have the port injection valve 22p and only has the in-cylinder injection valve 22c. Additionally, the diagnosis apparatus is applicable to abnormality diagnosis of a fuel pressure sensor of a multi-cylinder, four-cycle piston reciprocation diesel engine.

Further, the predetermined period Twch_th, the predetermined period Tact_th, the predetermined period Tdiag_a_th and Tdiag_b_th in the above embodiment may have the same length or may have different lengths. However, if the predetermined time period Tact_th and the predetermined period Tdiag_a_th have different lengths from each other, the predetermined time period Tdiag_a_th is preferably shorter than the predetermined period Tact_th.

In addition, the predetermined value ΔPfp_tgt that is an amount by which the target value Pfp_tgt is increased or decreased in the active control is equal to the fuel pressure difference threshold ΔPfp_th in the above embodiment. However, the predetermined value ΔPfp_tgt may be a value greater than the fuel pressure difference threshold ΔPfp_th.

Further, when a sum of the number of times of making the provisional determination (hereinafter referred to as "provisional abnormal determination") that the low pressure side fuel pressure sensor 71p is abnormal when the maximum target value setting is required, the number of times of making the provisional determination (provisional abnormal determination) that the low pressure side fuel pressure sensor 71p is abnormal when the maximum target value setting is not required, and the number of times of making the provisional determination (provisional abnormal determination) that the low pressure side fuel pressure sensor 71p is abnormal in the active control reaches a predetermined number of times, the fuel pressure sensor abnormality diagnosis apparatus according to the above embodiment makes the formal determination that the low pressure side fuel pressure sensor 71p is abnormal.

However, the fuel pressure sensor abnormality diagnosis apparatus may also be configured to count the provisional abnormal determination when the maximum target value setting is required, the provisional abnormal determination when the maximum target value setting is not required, and the provisional abnormal determination in the active control, respectively, and make the formal determination that the low pressure side fuel pressure sensor 71p is abnormal when any one of the sum of the provisional abnormal determinations reaches a predetermined number.

Similarly, when a sum of the number of times of making the provisional determination (hereinafter referred to as "provisional normal determination") that the low pressure side fuel pressure sensor 71p is normal when the maximum target value setting is required, the number of times of making the provisional determination (provisional normal determination) that the low pressure side fuel pressure sensor 71p is normal when the maximum target value setting is not required, and the number of times of making the provisional determination (provisional normal determination) that the low pressure side fuel pressure sensor 71p is normal in the active control reaches a predetermined number of times, the fuel pressure sensor abnormality diagnosis apparatus according to the above embodiment makes the formal determination that the low pressure side fuel pressure sensor 71p is normal.

However, the fuel pressure sensor abnormality diagnosis apparatus may also be configured to count the provisional normal determination when the maximum target value setting is required, the provisional normal determination when the maximum target value setting is not required, and the provisional normal determination in the active control, respectively, and make the formal determination that the low pressure side fuel pressure sensor 71p is normal when any one of the sum of the provisional normal determinations reaches a predetermined number.

Further, the fuel pressure sensor abnormality diagnosis apparatus may also be configured to not make the provisional abnormal determination or the provisional normal determination when the maximum target value setting is required or not required, and make the first abnormality diagnosis by only using the provisional abnormal determination or the provisional normal determination in the active control.

In addition, in the above embodiment, the ECU 70 starts the active control by increasing the target value Pfp_tgt by the predetermined value ΔPfp_tgt. However, the ECU 70 may start the active control by decreasing the target value Pfp_tgt by the predetermined value ΔPfp_tgt.

Further, if temperature of the low pressure side fuel pressure sensor 71$p$ is high, there is a possibility that accuracy of the detected value Pfp_dtc of the sensor 71$p$ is decreased due to the influence of the temperature. Therefore, in the above embodiment, the active control may be executed only when the temperature of the low pressure side fuel pressure sensor 71$p$ (for example, the temperature of the low pressure side fuel pressure sensor 71$p$ that is estimated from temperature of the engine 10) is less than predetermined temperature.

As described above, the internal combustion engine 10 to which the fuel pressure sensor abnormality diagnosis apparatus according to the embodiment of the invention (hereinafter referred to as "the exemplary diagnosis apparatus") is applied has the fuel supply system 30 that includes: a fuel pump (low pressure pump 31$p$) for supplying fuel to a fuel injection valve (port injection valve 22$p$); a fuel pressure sensor (low pressure side fuel pressure sensor 71$p$) for detecting a pressure Pfp of the fuel supplied from the fuel pump to the fuel injection valve; a target value setting unit (ECU 70, see FIG. 3) for setting a target value Pfp_tgt of the pressure of the fuel supplied from the fuel pump to the fuel injection valve; and a fuel pressure feedback control unit (ECU 70, see FIG. 2) for feedback controlling a fuel discharge amount of the fuel pump so that a detected value Pfp_dtc of the fuel pressure that is detected by the fuel pressure sensor coincides with the target value.

The exemplary diagnosis apparatus includes a fuel pressure sensor abnormality diagnosis unit (ECU 70, see FIG. 16) for diagnosing the abnormality of the fuel pressure sensor.

The fuel pressure sensor abnormality diagnosis unit diagnoses that the fuel pressure sensor is abnormal (see step 1620 to step 1640 of FIG. 16) in the case where, because a state where the detected value is less than the target value occurs, the fuel pressure feedback control unit increases the fuel discharge amount of the fuel pump, and as a result, the fuel discharge amount reaches a maximum amount of the fuel discharge amount of the fuel pump (see "Rduty=Rduty_max" in step 1610 of FIG. 16), and even if a first predetermined period (see the predetermined period Tdiag_b_th in FIG. 15 and the predetermined value Cdiag_b_th in the routine shown in FIG. 16) has elapsed since the fuel discharge amount reaches the maximum amount of the fuel discharge amount of the fuel pump (see "Yes" in step 1620 of FIG. 16), the detected value is less than the target value (see "Pfp_dtc<Pfp_tgt" in step 1610 of FIG. 16).

Figure 13:
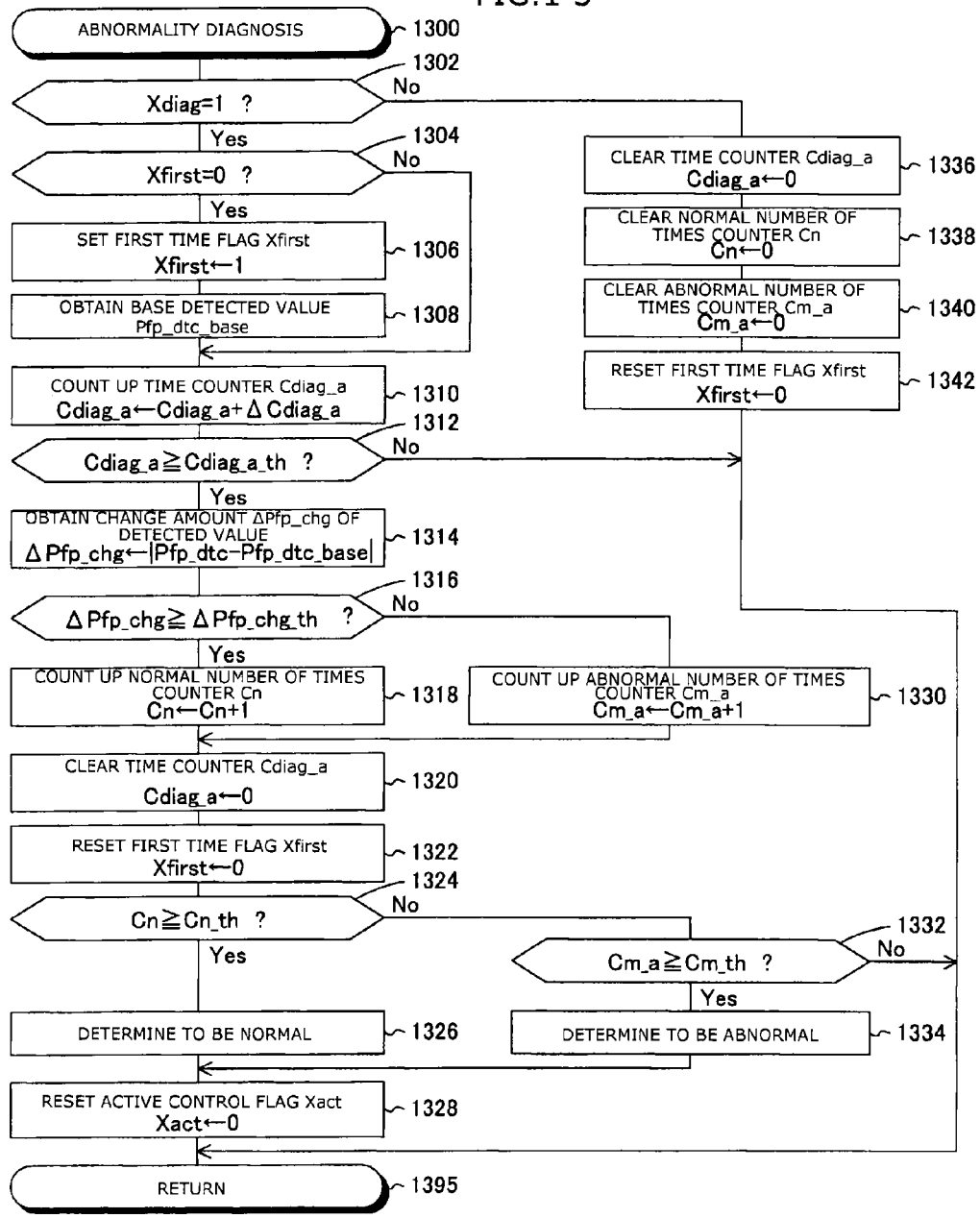
FIG. 13 is a flowchart showing an abnormality diagnosis routine that is executed by the CPU of the ECU shown in FIG. 1.
Figure 14:
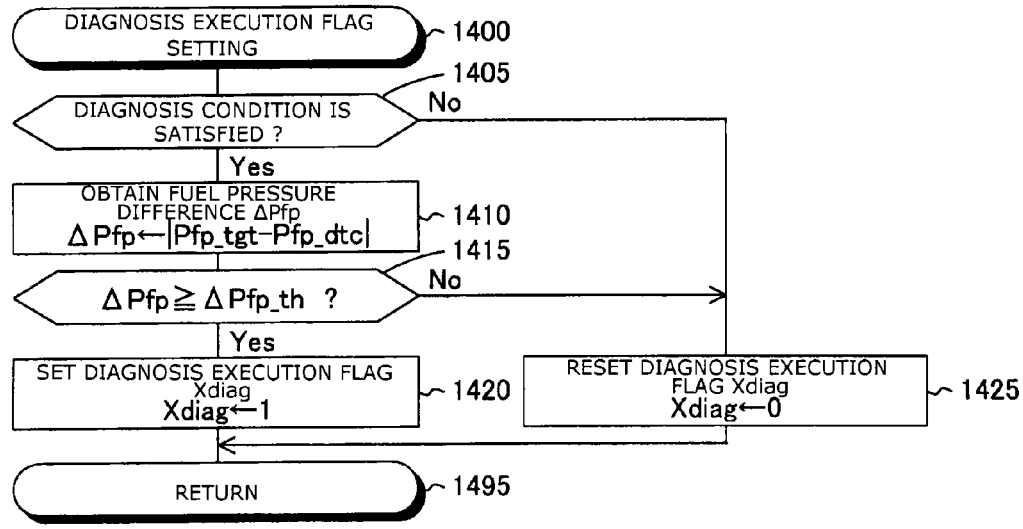
FIG. 14 is a flowchart showing a diagnosis execution flag setting routine that is executed by the CPU of the ECU shown in FIG. 1.

Further, in the exemplary diagnosis apparatus, the fuel pressure sensor abnormality diagnosis unit diagnoses that the fuel pressure sensor is abnormal (see step 1330 and step 1334 of FIG. 13) in the case where, because a fuel pressure deviation state where the detected value is deviated by a first predetermined value (see the fuel pressure difference threshold ΔPfp_th in FIG. 7A to FIG. 10B) or more from the target value occurs, the fuel pressure feedback control unit controls the fuel discharge amount of the fuel pump, but even if a second predetermined period (see the predetermined period Tdiag_a_th in FIG. 7A to FIG. 10B) has elapsed since the fuel pressure deviation state occurs (see "Yes" in step 1312 of FIG. 13), the detected value is not changed by a second predetermined value (see the change amount threshold ΔPfp_chg_th in FIG. 7A to FIG. 10B) or more toward the target value (see "No" in step 1316 of FIG. 13).

Further, in the exemplary diagnosis apparatus, the fuel pressure sensor abnormality diagnosis unit increases or decreases the target value by the first predetermined value or more to make the fuel pressure deviation state occur (see step 520 and step 540 of FIG. 5) in the case where, when the fuel discharge amount of the fuel pump does not reach its maximum amount (see "Xfb=1" in step 318 of FIG. 3), the fuel pressure deviation state does not occur during a third predetermined period (see the predetermined period Twch_th in FIG. 9A and FIG. 9B) or longer (see "Yes" in step 324 of FIG. 3).

Thus, the exemplary diagnosis apparatus can diagnose the abnormality of the fuel pressure sensor.

What is claimed is:

1. A fuel pressure sensor abnormality diagnosis apparatus for an internal combustion engine, the fuel pressure sensor abnormality diagnosis apparatus being applied to the internal combustion engine equipped with a fuel supply system, the fuel supply system including a fuel pump that supplies fuel to a fuel injection valve, a fuel pressure sensor that detects a pressure of the fuel supplied from the fuel pump to the fuel injection valve, a target value setting circuit that sets a target value of the pressure of the fuel supplied from the fuel pump to the fuel injection valve, and a fuel pressure feedback controller that performs feedback control of a fuel discharge amount of the fuel pump so that a detected value of the fuel pressure that is detected by the fuel pressure sensor coincides with the target value, the fuel pressure sensor abnormality diagnosis apparatus comprising:

a processor configured to diagnose an abnormality of the fuel pressure sensor, wherein the processor is configured to diagnose that the fuel pressure sensor is abnormal in a case where, because a state where the detected value is less than the target value occurs, the fuel pressure feedback controller increases the fuel discharge amount of the fuel pump, and as a result, the fuel discharge amount reaches a maximum amount of the fuel discharge amount of the fuel pump, and even if a first predetermined period has elapsed since the fuel discharge amount reaches the maximum amount of the fuel discharge amount of the fuel pump, the detected value is less than the target value, and the processor is configured to diagnose that the fuel pressure sensor is abnormal in a case where, because a fuel pressure deviation state where the detected value is deviated by a first predetermined value or more from the target value occurs, the fuel pressure feedback controller controls the fuel discharge amount of the fuel pump, a second predetermined period has elapsed since the fuel pressure deviation state occurs, and the detected value is not changed by a second predetermined value or more toward the target value.

2. The fuel pressure sensor abnormality diagnosis apparatus according to claim 1, wherein the processor is configured to increase or decrease the target value by the first predetermined value or more to make the fuel pressure deviation state occur in a case where, when the fuel discharge amount of the fuel pump does not reach the maximum amount of the fuel discharge amount of the fuel pump, the fuel pressure deviation state does not occur during a third predetermined period or longer.

3. The fuel pressure sensor abnormality diagnosis apparatus according to claim 1, wherein the fuel supply system includes a high pressure side and a low pressure side having a lower fuel pressure than the high pressure side, and the fuel pressure sensor is disposed on the low pressure side.

\* \* \* \* \*